United States Patent
Ohashi et al.

(10) Patent No.: US 12,042,733 B2
(45) Date of Patent: *Jul. 23, 2024

(54) NON-TRANSITORY COMPUTER-READABLE MEDIUM, INFORMATION PROCESSING SYSTEM, AND METHOD

(71) Applicant: GREE, Inc., Tokyo (JP)

(72) Inventors: Keiya Ohashi, Tokyo (JP); Akiyoshi Maeda, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,952

(22) Filed: Dec. 1, 2021

(65) Prior Publication Data

US 2022/0088491 A1   Mar. 24, 2022

Related U.S. Application Data

(63) Continuation of application No. 16/848,119, filed on Apr. 14, 2020, now Pat. No. 11,219,832, which is a continuation of application No. 16/227,661, filed on Dec. 20, 2018, now Pat. No. 10,661,179, which is a continuation of application No. 15/797,587, filed on Oct. 30, 2017, now Pat. No. 10,213,694, which is a continuation of application No. 14/721,894, filed on May 26, 2015, now Pat. No. 9,808,723.

(30) Foreign Application Priority Data

May 26, 2014 (JP) ................................ 2014-108213

(51) Int. Cl.
| | | |
|---|---|---|
| A63F 9/24 | (2006.01) | |
| A63F 11/00 | (2006.01) | |
| A63F 13/77 | (2014.01) | |
| A63F 13/822 | (2014.01) | |
| G06F 13/00 | (2006.01) | |
| G06F 17/00 | (2019.01) | |
| A63F 13/35 | (2014.01) | |

(52) U.S. Cl.
CPC ............ *A63F 13/77* (2014.09); *A63F 13/822* (2014.09); *A63F 13/35* (2014.09)

(58) Field of Classification Search
CPC ............................. G07F 17/32; G07F 17/3211
USPC .................. 463/1, 14, 20, 22, 25, 39, 42, 43
See application file for complete search history.

(56) References Cited

PUBLICATIONS

Notice of Reasons for Refusal dated Sep. 27, 2022, issued in corresponding Japanese Patent Application No. 2021-142899 with English machine translation (7 pgs.).

(Continued)

*Primary Examiner* — Adetokunbo O Torimiro
(74) *Attorney, Agent, or Firm* — Pillsbury Winthrop Shaw Pittman, LLP

(57) ABSTRACT

Provided is a control method of a game executed by an information processing device, the method including: storing a plurality of first game media associated with a first player and a plurality of second game media associated with a second player, the plurality of first game media being associated with ability information, placing one or more first selection game media; producing an effect corresponding to the ability information selected; placing one or more second selection game media; converting at least a part of the one or more first selection game media placed in the field from the first parameter state to the second parameter state; and changing a use status of the ability information associated with the one or more first selection game media converted from the first parameter state to the second parameter state.

15 Claims, 15 Drawing Sheets

(56) References Cited

PUBLICATIONS

ReversiQuest, 4Gamer.net[online], Sep. 14, 2015, URL :<http://web.archive.org/web/20150914155147/https://www.4gamer.net/games /226/G022647/>, [retrieved on Sep. 16, 2022]—4 pgs.

Decision of Refusal dated Feb. 21, 2023, issued in corresponding Japanese Patent Application No. 2021-142899 with English translation (6 pgs.).

Notice of Reasons for Refusal dated Jun. 4, 2024, issued in corresponding Japanese Patent Application No. 2023-080794 with English translation (11 pgs.).

| | a | b | c | d | e | f |
|---|---|---|---|---|---|---|
| 4 | a4 | b4 | c4 | d4 | e4 | f4 |
| 3 | a3 | b3 | c3 | d3 | e3 | f3 |
| 2 | a2 | b2 | c2 | d2 | e2 | f2 |
| 1 | a1 | b1 | c1 | d1 | e1 | f1 |

| Area | Character | State of parameter |
|---|---|---|
| a1 | | |
| a2 | | |
| a3 | | |
| a4 | | |
| b1 | | |
| b2 | E | 1 |
| b3 | J | 2 |
| b4 | | |
| c1 | | |
| c2 | C | 2 |
| c3 | A | 2 |
| c4 | | |
| d1 | F | 2 |
| d2 | D | 1 |
| d3 | B | 2 |
| d4 | | |
| e1 | I | 1 |
| e2 | | |
| e3 | G | 2 |
| e4 | | |
| f1 | | |
| f2 | | |
| f3 | | |
| f4 | H | 2 |

FIG. 7

| First player | | | Second player | | |
|---|---|---|---|---|---|
| Character | Skill information | State of skill usage | Character | Skill information | State of skill usage |
| A | α1 | Used | B | β1 | Unusable |
| D | α2 | Unusable | C | β2 | Unusable |
| E | α3 | Usable | F | β3 | Used |
| G | α4 | Used | H | β4 | Usable |
| I | α5 | Usable | J | β5 | Usable |
| | | | | | |
| | | | | | |
| | | | | | |
| | | | | | |
| | | | | | |
| | | | | | |
| | | | | | |
| | | | | | |

NON-TRANSITORY COMPUTER-READABLE MEDIUM, INFORMATION PROCESSING SYSTEM, AND METHOD

CROSS-REFERENCE TO RELATED APPLICATION

This application is a Continuation Application of U.S. Ser. No. 16/848,119, filed on Apr. 14, 2020, which is a Continuation application of U.S. Ser. No. 16/227,661, filed on Dec. 20, 2018, now U.S. Pat. No. 10,661,179, which is a Continuation application of U.S. Ser. No. 15/797,587, filed on Oct. 30, 2017, now U.S. Pat. No. 10,213,694, which is a Continuation application of U.S. Ser. No. 14/721,894, filed on May 26, 2015, now U.S. Pat. No. 9,808,723, and claims the benefit of priority under 35 U.S.C. 119 from Japanese Patent Application No. 2014-108213, filed on May 26, 2014. The subject matter of each of the above applications is incorporated herein by reference in entirety.

TECHNICAL FIELD

This disclosure relates to a non-transitory computer-readable medium, an information processing system, and a method.

BACKGROUND

An example of a reversi game device displays a plurality of pieces and a board on a screen. The pieces have a different attribute for each player and are each one of three patterns in a relationship constituting a three-way standoff (see JP 2007-229361 A). In this reversi game device, the player who is taking a turn places a piece on the board. At this time, if a predetermined condition is satisfied, the attribute and the pattern change in each piece positioned in a square between the newly placed piece and a piece having the same attribute as the newly placed piece.

In other words, in a game executable on a background reversi game device, a piece is placed on the board, and the attribute of pieces positioned in squares between pieces having the same attribute changes. In a background reversi game device, this simple operation is repeated. Hence, gameplay sometimes becomes monotonous. A background reversi game device thus lacks a variety of strategies, resulting in a game that is not always very strategic. Therefore, the user may grow bored.

We provide a non-transitory computer-readable medium, an information processing system, and a method that offer a greater variety of game strategies and make a game more interesting.

SUMMARY

One aspect of the present disclosure is related to a control method of a game executed by an information processing device. In one aspect, the control method includes: storing a plurality of first game media associated with a first player and a plurality of second game media associated with a second player, each of the plurality of first game media and each of the plurality of second game media having a plurality of parameters, the plurality of parameters including a first parameter and a second parameter different from the first parameter, each of the plurality of first game media being associated with a piece of ability information.

The control method further comprises the steps of: placing one or more first selection game media, selected from the plurality of first game media based on selection made by the first player, in a first area within a field in a first parameter state in which the first parameter is valid, such that one or more pieces of the ability information associated with the one or more first selection game media are made usable in the game; in response to the first player selecting at least one of the one or more pieces of the ability information made usable, producing an effect corresponding to the selected at least one of the one or more pieces of the ability information selected; placing one or more second selection game media, selected from the plurality of second game media based on selection made by the second player, in a second area within the field in a second parameter state in which the second parameter is valid; in response to the one or more second selection game media being placed in the field, converting at least a part of the one or more first selection game media placed in the field from the first parameter state to the second parameter state; and in response to the one or more second selection game media being placed in the field, changing a use status of the one or more pieces of the ability information associated with the one or more first selection game media converted from the first parameter state to the second parameter state.

In the control method of one aspect of the present invention, in response to the one or more second selection game media being placed in the field, the use status of the one or more pieces of the ability information associated with the one or more first selection game media converted from the first parameter state to the second parameter state may be changed from Usable to Unusable.

The control method of one aspect of the present invention may further include: converting, to the first parameter state, the one or more first selection game media converted from the first parameter state to the second parameter state; and changing the use status of the one or more pieces of the ability information associated with the one or more first selection game media converted from the second parameter state to the first parameter state.

In the control method of one aspect of the present invention, the use status of the one or more pieces of the ability information associated with the one or more first selection game media converted from the second parameter state to the first parameter state is changed from Unusable to Usable.

The control method of one aspect of the present invention may further include the step of varying at least one of a first point associated with the first player or a second point associated with the second player by using the one or more pieces of the ability information.

The control method of one aspect of the present invention may further include the step of varying at least one of the plurality of parameters by using the one or more pieces of the ability information.

In the control method of one aspect of the present invention, parameter states of the one or more first selection game media and the one or more second selection game media may be converted between the first parameter state and the second parameter state by using the one or more pieces of the ability information.

In the control method of one aspect of the present invention, the one or more first selection game media placed in the first area are moved to an area in the field other than the first area by using the one or more pieces of the ability information.

In the control method of one aspect of the present invention, the one or more second selection game media placed in the second area are moved to an area in the field other than the second area by using the one or more pieces of the ability information.

In the control method of one aspect of the present invention, a part of areas in the field is set as an area in which neither the one or more first selection game media nor the one or more second selection game media are placed, by using the one or more pieces of the ability information.

In the control method of one aspect of the present invention, the one or more pieces of the ability information made usable are displayed in an area outside the field on a game screen.

In the control method of one aspect of the present invention, the use status of the one or more pieces of the ability information selected by the first player is changed.

In the control method of one aspect of the present invention, the use status of the one or more pieces of the ability information selected by the first player is changed from Usable to Unusable.

One aspect of the present disclosure is related to an information processing device for executing a game.

In one aspect, the information processing device includes: a storage unit for storing a plurality of first game media associated with a first player and a plurality of second game media associated with a second player, each of the plurality of first game media and each of the plurality of second game media having a plurality of parameters, the plurality of parameters including a first parameter and a second parameter different from the first parameter, each of the plurality of first game media being associated with a piece of ability information.

The information processing device further comprises: a control unit configured to: place one or more first selection game media, selected from the plurality of first game media based on selection made by the first player, in a first area within a field in a first parameter state in which the first parameter is valid, such that one or more pieces of the ability information associated with the one or more first selection game media are made usable in the game; in response to the first player selecting at least one of the one or more pieces of the ability information made usable, produce an effect corresponding to the selected at least one of the one or more pieces of the ability information selected; and place one or more second selection game media, selected from the plurality of second game media based on selection made by the second player, in a second area within the field in a second parameter state in which the second parameter is valid; and a conversion unit configured to, in response to the one or more second selection game media being placed in the field, convert at least a part of the one or more first selection game media placed in the field from the first parameter state to the second parameter state, wherein in response to the one or more second selection game media being placed in the field, the control unit changes a use status of the one or more pieces of the ability information associated with the one or more first selection game media converted from the first parameter state to the second parameter state.

One aspect of the present disclosure is related to a non-transitory computer-readable storage medium.

In one aspect, the storage medium stores a program for causing an information processing device for executing a game to perform the step of: storing a plurality of first game media associated with a first player and a plurality of second game media associated with a second player, each of the plurality of first game media and each of the plurality of second game media having a plurality of parameters, the plurality of parameters including a first parameter and a second parameter different from the first parameter, each of the plurality of first game media being associated with a piece of ability information.

The program further causes the information processing device to perform the steps of: placing one or more first selection game media, selected from the plurality of first game media based on selection made by the first player, in a first area within a field in a first parameter state in which the first parameter is valid, such that one or more pieces of the ability information associated with the one or more first selection game media are made usable in the game; in response to the first player selecting at least one of the one or more pieces of the ability information made usable, producing an effect corresponding to the selected at least one of the one or more pieces of the ability information selected; placing one or more second selection game media, selected from the plurality of second game media based on selection made by the second player, in a second area within the field in a second parameter state in which the second parameter is valid; in response to the one or more second selection game media being placed in the field, converting at least a part of the one or more first selection game media placed in the field from the first parameter state to the second parameter state; and in response to the one or more second selection game media being placed in the field, changing a use status of the one or more pieces of the ability information associated with the one or more first selection game media converted from the first parameter state to the second parameter state.

Our non-transitory computer-readable medium, information processing system, and method offer a greater variety of game strategies and make a game more interesting.

BRIEF DESCRIPTION OF THE DRAWINGS

In the accompanying drawings:

FIG. 3 illustrates an example of the state of a field on which characters have been placed as a result of game progress;

FIG. 4 schematically illustrates an example of a field management data;

FIG. 7 schematically illustrates an example of a skill management data;

DETAILED DESCRIPTION

The following describes exemplary embodiments with reference to the drawings.

Figures 1, 2:
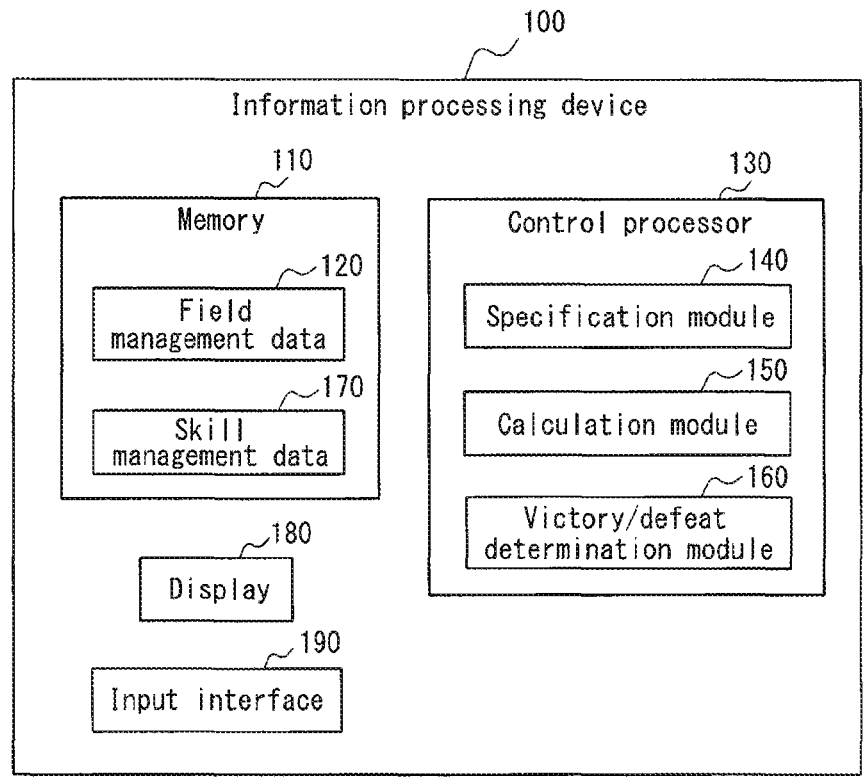
FIG. 1 is a functional block diagram of a section of an information processing device according to an embodiment.
FIG. 2 illustrates an example of a field used in a game according to an embodiment.

FIG. 1 is a functional block diagram of a section of an information processing device according to an embodiment. The players of the game on the information processing device 100 according to the present embodiment are a single user (player one) and a player automatically controlled by the information processing device 100 (player two). The information processing device 100 is, for example, a dedicated device that can execute the game described below. The information processing device 100 may be configured using an electronic device such as a mobile phone, a tablet terminal, or the like.

The information processing device 100 includes a memory 110, field management data 120, control processor 130, specification module 140, calculation module 150, victory/defeat determination module 160, skill management data 170, display 180, and input interface 190. The field management data 120 and the skill management data 170 are portions of the information (data) that the memory 110 stores. The specification module 140, calculation module 150, and victory/defeat determination module 160 are software that execute particular, specific processing among the processing executed by the control processor 130.

The memory 110 stores a variety of information used in game processing. The memory 110 stores a plurality of game media used by the players in the game and a plurality of parameters uniquely associated with each game medium. The game media are electronic data used in the game and include, for example, cards, items, characters, avatars, and the like. Furthermore, the game media are electronic data that, in accordance with game progress, may be acquired, held, used, managed, traded, combined, strengthened, sold, discarded, and/or transferred by players in the game, yet the forms of use for the game media are not limited to the forms specified in this disclosure. In this disclosure, the game media are described as being characters. The parameters uniquely associated with each game medium are indices or the like indicating combat strength such as attack points and defense points of the game medium, combat means such as attack means and defense means of the game medium, the below-described skill information of the game medium, information on the avatar of the game medium, the below-described attribute of the game medium, and the rarity value of the game medium. The index indicating the rarity value of the game medium may be expressed by levels such as normal, rare, super rare, ultra-rare, and the like.

The memory 110 stores skill information associated with characters. Details on the skill information are provided below. The memory 110 may also store points that are associated with each player and used during game progress. The points associated with each player are, for example, virtual hit points (HP) associated with the player in the game, action points used for game progress by the player, or the like. The hit points associated with each player increase or decrease in accordance with game progress. The hit points associated with each player may increase or decrease based on the parameters of the game medium. Victory or defeat in the game is determined by the below-described victory/defeat determination module 160 based on the hit points associated with each player. The action points associated with each player are points necessary for the player to make progress in the game. When a player makes progress in the game, the action points associated with the player decrease in accordance with the content of the game progress. When the action points associated with the player fall to zero or lower, the player can no longer make progress in the game. A player who can no longer make progress in the game is determined by the victory/defeat determination module 160 to be the loser of the game. When beginning a game, the memory 110 stores a plurality of game media selected by each player in the game in association with the player.

The field management data 120 is data for managing information related to the field displayed on the display 180. Each player plays the game by placing characters on the areas in the field.

The field management data 120 includes information related to the character placed in each area on the field and the state of parameter of the character. In the field management data 120 manages the character and the state of parameter of the character are managed in association with each area of the field.

The state of parameter is represented on the display 180 by a variety of methods. The state of parameter may be represented by the color of the displayed character. In this case, the character associated with each state of parameter is displayed in the color for that state of parameter, such as white, black, or the like. The state of parameter may also be represented by the shape of the displayed character. In this case, the character associated with each state of parameter is displayed in the shape for that state of parameter, such as the form of a robot, a human, an animal, or the like. The state of parameter may also be represented by a marker attached to a portion of the displayed character. In this case, the character associated with each state of parameter is displayed with the label for that state of parameter attached thereto, such as a coat of arms, a banner, or the like. The state of parameter may also be represented by the direction of the displayed character. In this case, the character associated with each state of parameter is displayed facing the direction on the field associated with that state of parameter, such as up/down/left/right.

The control processor 130 is a processor that controls and manages the entire information processing device 100, starting with the functional blocks of the information processing device 100. The control processor 130 is configured using a processor, such as a Central Processing Unit (CPU) that executes a program in which control procedures for the game are prescribed. This program is stored in the memory 110 or on an external storage medium. The control processor 130 can automatically operate player two in the game.

Based on a designation by an attacking player, the control processor 130 stores, in the table of the field management data 120, information on the character designated by the attacking player and the state of parameter when the attacking player places the character on the field, storing the information in association with an area designated by the attacking player. In this disclosure, the attacking player refers to the player that places a character on the field during a certain turn. The player that does not place a character on the field during that turn is referred to as the defending player. The table of the field management data 120 is described below with reference to FIG. 4. As for the state of parameter, which is also described below, a first parameter is associated with the user that is player one in the present embodiment.

During a turn in which the user of the information processing device 100 (player one) is the attacking player, the user designates a character and an area in which to place the character, using the input interface 190. The control processor 130 then stores the designated character as the character in the row of the designated area in the table of the field management data 120. As the state of parameter, the control processor 130 stores the state of first parameter corresponding to the user. During a turn in which the player automatically controlled by the information processing device 100 (player two) is the attacking player, the control processor 130 designates a character and an area in which to place the character. Next, the control processor 130 stores the self-designated character as the character in the row of the self-designated area in the table of the field management data 120. As the state of parameter, the control processor 130 stores the state of second parameter corresponding to player two in the row of the self-designated area in the table of the field management data 120.

In the table of the field management data 120, the control processor 130 converts the state of parameter associated with a specific area specified by the below-described specification module 140. The specific area is an area in a predetermined positional relationship with respect to the area designated by the attacking player and is associated, in the table of the field management data 120 in FIG. 4, with a different state of parameter than the state of parameter of the character placed on the field by the attacking player. When player one is the attacking player, the character placed by the attacking player is in the state of first parameter. Accordingly, the specific area is an area in a predetermined positional relationship with respect to the area designated by the attacking player and is associated, in the table of the field management data 120, with the state of second parameter.

The control processor 130 performs the above-mentioned state of parameter conversion by converting the state of parameter associated with the specific area to the state of parameter of the character placed by the attacking player. Once the state of parameter is converted, the parameter in the converted state of parameter becomes valid, and the parameter in the state of parameter before the conversion becomes invalid.

When storing the information on the character and the state of parameter in the table of the field management data 120, the control processor 130 also registers skill information, associated with the character stored in the table of the field management data 120, in the below-described skill management data 170. The skill information is an example of information related to a unique ability (ability information) associated with each character. In this disclosure, the ability information is described as being skill information on a character, yet the ability information is not limited to skill information and may be any information related to a unique ability associated with a character. The skill information achieves a predetermined effect during game progress. All of the characters may be associated with some form of skill information. Alternatively, it is possible for only a portion of the characters to be associated with skill information. Based on a predetermined condition, the control processor 130 executes processing related to skill information registered in the skill management data 170.

The specification module 140 specifies a specific area. The relationship between areas for specifying a specific area may be any relationship. In the game by the information processing device 100 according to the present embodiment, the specification module 140 specifies a specific area in the following way.

First, on the field, the specification module 140 generates predetermined axes passing through the area designated by the attacking player. The axes may be in any direction. In this disclosure, the specification module 140 generates axes in four directions: vertical, horizontal, upper-right, and lower-right. Next, the specification module 140 extracts, from the table of the field management data 120, each area associated with the same state of parameter (area of identical parameter) as the state of parameter of the character placed by the attacking player. The specification module 140 determines which area of identical parameter(s) satisfies the condition of being located away, along one of the generated axes, from the area in which the character was placed. The specification module 140 then specifies, as a specific area, each area that is sandwiched between the area in which the attacking player placed the character and an area determined by the above-described method.

When the attacking player places a character, the calculation module 150 calculates the hit points associated with the defending player based on the valid parameter of the placed character and the valid parameter of the character located in the specific area. In the present embodiment, in addition to the valid parameter of the placed character and the valid parameter of the character located in the specific area, the calculation module 150 calculates the hit points associated with the defending player in particular based on the valid parameter of the character associated with the area of identical parameter. The calculation module 150 may use any method of calculation. In the present embodiment, the calculation module 150 calculates damage as the difference between the total of the parameter of the characters associated with the attacking player and the parameter of the character associated with the defending player. The calculation module 150 calculates the hit points associated with the defending player by subtracting the calculated damage from the hit points associated with the defending player.

Each time the calculation module 150 calculates the hit points associated with a player, the victory/defeat determination module 160 determines whether victory or defeat has been decided. The victory/defeat determination module 160 determines victory or defeat based on the hit points associated with the players. At a predetermined stage of game progress, the victory/defeat determination module 160 may decide that a player with a high number of hit points is the winner. The victory/defeat determination module 160 may also decide that a player whose hit points have fallen to zero or less is the loser. In this case, the victory/defeat determination module 160 determines whether the hit points associated with the defending player have fallen to zero or less. When the hit points associated with the defending player have fallen to zero or less, the victory/defeat determination module 160 decides that the defending player is the loser and that the attacking player is the winner, thus concluding the game. In this disclosure, the victory/defeat determination module 160 is described below as deciding that a player whose hit points have fallen to zero or less is the loser.

The winner decided by the victory/defeat determination module 160 is not limited to being the attacking player. Upon the attacking player placing a character on the field, the skill of a character for the defending player may take effect, causing the hit points associated with the attacking player to become zero or less. Furthermore, upon the attacking player placing a character on the field, an event (described below) in the area of placement may be triggered, causing the hit points associated with the attacking player to become zero or less. In these cases, the victory/defeat determination module 160 decides that the attacking player whose hit points have fallen to zero or less is the loser and that the defending player whose hit points are greater than zero is the winner.

The skill management data 170 is data for managing skill information. As described below with reference to FIG. 7, the skill management data 170 includes a table.

As described above, when the attacking player places a character on the field, the control processor 130 registers the skill information associated with the placed character in the table of the skill management data 170. The skill information is registered in the table of the skill management data 170 in association with the player who placed the character. The skill associated with a character placed by player one as the attacking player is registered in the column for player one in the table of the skill management data 170. The skill associated with a character placed by player two as the attacking player is registered in the column for player two in the table of the skill management data 170. Players can use skills upon skill information being registered in the table of the skill management data 170. Accordingly, after placing a character, a player becomes able to use the skill associated with the character.

The display 180 is a display device, such as a liquid crystal display, an organic EL display, or an inorganic EL display. Along with the field used in the game, the display 180 displays the information managed in the table of the field management data 120 in FIG. 4, the information managed in the table of the skill management data 170 in FIG. 7, and the like.

The input interface 190 receives input by user operation. The input interface 190 may be configured using operation buttons (operation keys). When the information processing device 100 includes a touch panel, the touch panel functions as the input interface 190 by receiving input through detection of contact by the user's finger, a stylus pen, or the like. The user uses the input interface 190 to designate a character to place on the field, an area on the field, and the like.

Next, a game that can be executed by the information processing device 100 according to the present embodiment is outlined. In the game executed by the information processing device 100, players one and two that have a certain number of points take turns placing a game medium in an area, on the field displayed on the display 180, in which no character has been placed. The characters each have a plurality of unique parameters. In the present embodiment, each character has two parameters: a first parameter and a second parameter. Each character is placed on the field in a state such that either the first or the second parameter is valid. When player one places a character on the field, the character is placed in a state such that the first parameter is valid (state of first parameter). When player two places a character on the field, the character is placed in a state such that the second parameter is valid (state of second parameter). The two players place characters by turns. Accordingly, during each turn, the attacking player and the defending player alternate.

Once a player places a character in a certain area, the information processing device 100 specifies each specific area that is in a predetermined positional relationship with respect to the area in which the character was placed and that contains a character with a different state of parameter than the state of parameter of the placed character. The state of parameter is a state indicating which of a plurality of parameters (first or second parameter) is valid. Accordingly, when player one places a character in a certain area as the attacking player, the information processing device 100 specifies each specific area that is in a predetermined positional relationship with respect to the area in which the character was placed and that contains a character in the state of second parameter. The predetermined positional relationship may be any positional relationship. The predetermined positional relationship in the present embodiment is a positional relationship such that the specific area is located away, along a predetermined axis on the field, from the area in which the character was placed. The method of specifying specific areas based on this predetermined positional relationship is described below with reference to FIGS. SA, SB, and SC.

Based on the valid parameter of the character placed by the attacking player and the valid parameter of the character in the specific area, the information processing device 100 calculates the hit points associated with the defending player. When player one is the attacking player, the information processing device 100 calculates the hit points associated with player two based on the first parameter of the character placed by player one and the second parameter of the character in the specific area.

The calculation of hit points associated with player two is made by treating the difference between the parameter of the first character and the parameter of the second character as damage and subtracting the damage from the pre-calculation hit points of player two. Suppose the pre-calculation hit points of player two are "100", the first parameter of the character placed by player one is "30", and the second parameter of the character in the specific area is "20". In this case, the difference "10" between the parameter "30" of the first character and the parameter "20" of the second character is subtracted as damage from the pre-calculation hit points "100" of player two. Hence, the hit points associated with player two are calculated as "90". When the difference is zero or less, the hit points associated with the defending player are not reduced.

The information processing device 100 also converts the state of parameter of the character in the specific area to the state of parameter of the character placed by the attacking player. In the above-described example, the second parameter was valid for the character in the specific area. The attacking player then placed a character whose first parameter is valid in the above-described area. The information processing device 100 therefore makes the first parameter of the character in the specific area valid. At this time, the second parameter of the character in the specific area is made invalid.

The two players repeatedly take turns attacking and defending, thus causing each other's hit points to decrease. The game ends when the hit points associated with one of the players falls to zero or less. At this time, the player whose hit points have fallen to zero or less is the loser of the game, and the player whose hit points are greater than zero is the winner of the game.

FIG. 2 illustrates an example of a field used in a game according to an embodiment. As illustrated in FIG. 2, the field used in the game according to the present embodiment is a 4×6 rectangle containing 24 areas. In the explanation of the present embodiment, the rows of the field are numbered 1 to 4 in order from bottom to top. The columns of the field are labeled a to f in order from left to right. One area is thus specified by a combination of a number indicating the row and a lowercase letter indicating the column. The areas in the top row of the field in FIG. 2 are labeled a4, b4, c4, d4, e4, and f4 in order from the left.

Figure 3:
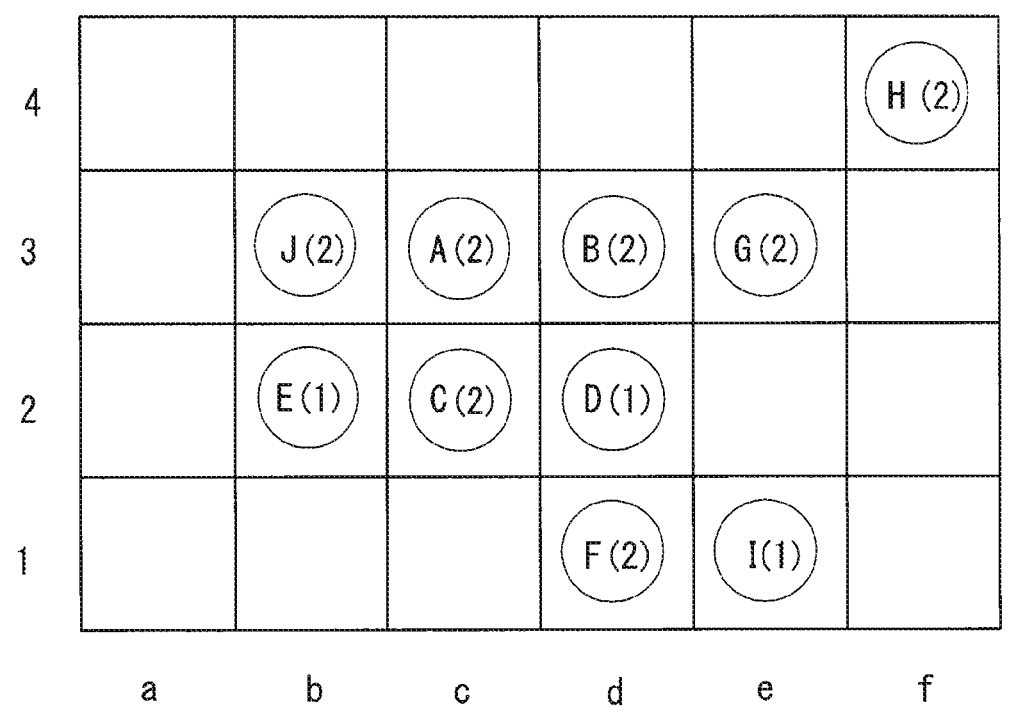

FIG. 3 illustrates an example of the state of a field on which characters have been placed as a result of game progress. In this disclosure, each character is represented by a capital letter. The state of parameter of each character is indicated by the number in parentheses. "E(1)" indicates that character "E" is positioned on the field in the state of first parameter. "J(2)" indicates that character "J" is positioned on the field in the state of second parameter.

FIG. 4 schematically illustrates an example of the field management data 120. The field management data 120 includes a table such as the one in FIG. 4. As illustrated in FIG. 4, a character and the state of parameter of the character are stored in association with each area in the table.

The table in FIG. 4 is the table for when the field is in the state illustrated in FIG. 3. As can be seen by referring to area b2 in FIG. 3, character E is positioned in the state of first parameter. This state on the field is implemented in the table of the field management data 120 in FIG. 4 by storing the following data in the row for area "b2": character "E" and the corresponding state of parameter "1". As indicated by these data, the state of first parameter is valid for character E. Character F, positioned in area d1 in FIG. 3, is in the state of second parameter, and in the table of the field management data 120 in FIG. 4, the following data are stored in the row for area "d1": character "F" and the corresponding state of parameter "2". As indicated by these data, the state of second parameter is valid for character F. For areas in FIG. 3 in which no character has been placed (such as area a1), no data are stored in the character and state of parameter columns in the table of the field management data 120 in FIG. 4.

FIGS. SA, SB, and SC schematically illustrate an example of a method for the specification module 140 to specify a specific area. Here, it is assumed that in the state in FIG. 3, player one has designated placement of character K in area d4. At this time, character K and the first parameter are stored in the table of the field management data 120 in association with area d4.

Figure 5A:
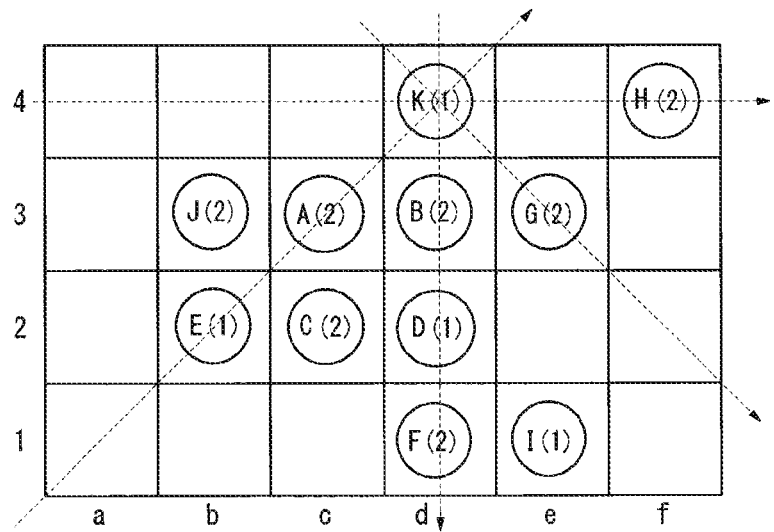
FIGS. 5A, 5B, and 5C schematically illustrate an example of a method for the specification module to specify a specific area.
Figure 5B:
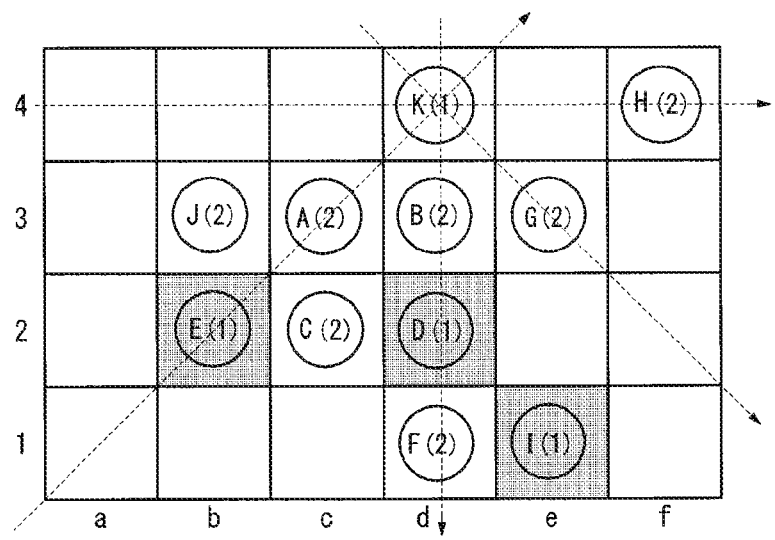
Figure 5C:
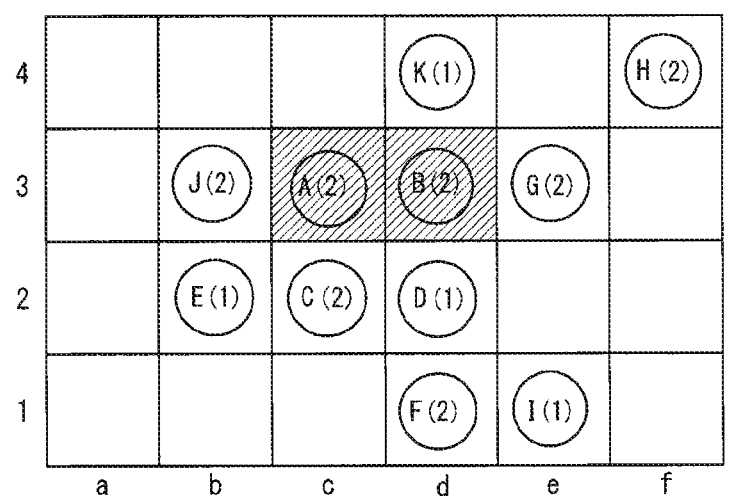

First, as illustrated by the arrows in FIG. 5A, the specification module 140 generates four axes passing through area d4. Next, the specification module 140 refers to the table of the field management data 120 in FIG. 4. The specification module 140 thus extracts areas associated with the same state of first parameter as character K. As illustrated by the shading in FIG. 5B, the specification module 140 extracts areas b2, d2, and e1 as the areas of identical parameter. Since the state of parameter of character K is the first parameter, the areas of identical parameter are first parameter areas. The specification module 140 determines which first parameter area(s) satisfy the condition of being located away from area d4 along one of the generated axes. The specification module 140 determines that, in FIG. 5B, area b2 and area d2 are first parameter areas that satisfy the condition. Area e1 is not along one of the generated axes and thus does not satisfy the condition. As illustrated by the diagonal lines in FIG. 5C, the specification module 140 specifies area c3, which is sandwiched between area d4 and area b2, and area d3, which is sandwiched between area d4 and area d2, as specific areas. Area d1 is not sandwiched between area d4 and area d2 and therefore is not specified as a specific area. When a plurality of areas are sandwiched, the specification module 140 specifies all of the areas as specific areas.

Figure 6A:
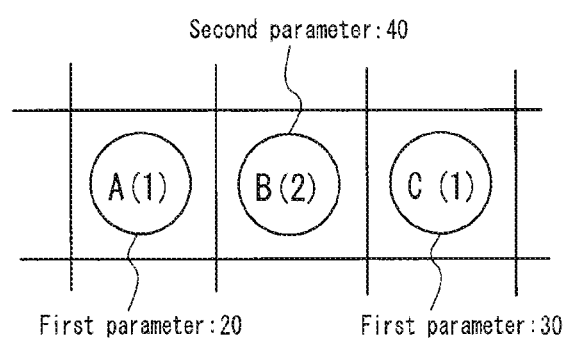
FIGS. 6A and 6B illustrate an example of a calculation method used by the calculation module.
Figure 6B:
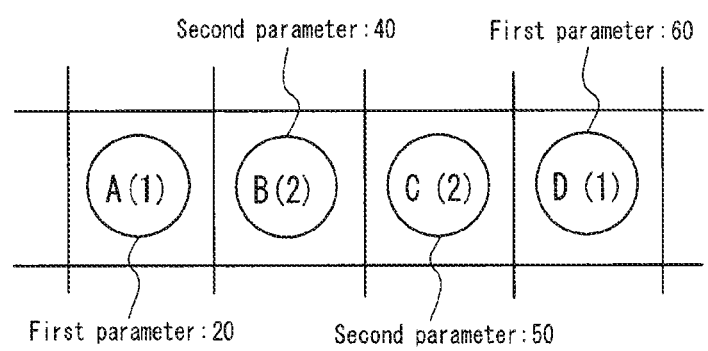

Next, with reference to FIGS. 6A and 6B, the calculation of hit points made by the calculation module 150 is described using specific numerical values. FIGS. 6A and 6B illustrate an example of a calculation method used by the calculation module 150.

In the state in FIG. 6A, character B for whom the second parameter is valid and character C for whom the first parameter is valid have been placed in advance on the field. The following describes calculation of hit points when, in this state, player one is the attacking player and places character A on the field. Assume that the first parameter of character A is 20, the second parameter of character B is 40, and the first parameter of character C is 30. Also assume that the hit points associated with the defending player are "300".

When player one places character A on the field, character A is in a state such that the first parameter is valid. At this time, the area associated with character B is sandwiched between areas respectively associated with characters A and C. Accordingly, the area associated with character B is specified by the specification module 140 as a specific area. In this case, the calculation module 150 first calculates the total of the first parameter "20" of character A and the first parameter "30" of character C, i.e. "50". Next, the calculation module 150 calculates the difference between this total "50" and the second parameter "40" of character B, i.e. "10". By subtracting the difference "10" as damage from the hit points "300" associated with the defending player, the calculation module 150 calculates the hit points associated with the defending player to be the result of subtraction, i.e. "290". When the difference is zero or less, the calculation module 150 does not change the hit points associated with the defending player. In other words, the damage to the defending player is "0".

In the state in FIG. 6B, character B for whom the second parameter is valid, character C for whom the second parameter is valid, and character D for whom the first parameter is valid have been placed in advance on the field. The following describes calculation of hit points when, in this state, player one is the attacking player and places character A on the field. Assume that the first parameter of character A is 20, the second parameter of character B is 40, the second parameter of character C is 50, and the first parameter of character D is 60. Also assume that the hit points associated with the defending player are "300".

When player one places character A on the field, character A is in a state such that the first parameter is valid. At this time, the areas associated with characters B and C are sandwiched between areas respectively associated with characters A and D. Accordingly, the areas associated with characters B and C are specified by the specification module 140 as specific areas. When a plurality of consecutive areas are thus specified as specific areas, the calculation module 150 calculates the hit points associated with the defending player based on the valid parameter of the placed character and on the valid parameter of the characters located in the specific areas.

The calculation module 150 first calculates the total of the first parameter "20" of character A and the first parameter "60" of character D, i.e. "80". Next, the calculation module 150 calculates the difference between this total "80" and the second parameter "40" of character B located in one of the specific areas, i.e. "40". Next, the calculation module 150 calculates the difference between the total "80" and the second parameter "50" of character C located in the other specific area, i.e. "30". By subtracting both of the differences "40" and "30" as damage from the hit points "300" associated with the defending player, the calculation module 150 then calculates the hit points associated with the defending player to be the result of subtraction, i.e. "230".

When a plurality of consecutive areas are specified as specific areas as illustrated in FIG. 6B, the calculation module 150 may increase the damage inflicted on the defending player by a predetermined ratio. The predetermined ratio may be any ratio. In the present embodiment, the calculation module 150 may multiply the calculated difference by the number of consecutive specific areas and treat the result of multiplication as the damage. In FIG. 6B, there are two consecutive specific areas. In this case, the calculation module 150 multiplies the calculated differences "40" and "30" each by two, yielding "80" and "60". By subtracting the results of multiplication "80" and "60" as damage from the hit points "300" associated with the defending player, the calculation module 150 calculates the hit points associated with the defending player to be the result of subtraction, i.e. "160". In this way, when a plurality of consecutive areas are specified as specific areas, the damage inflicted on the defending player may be increased by a predetermined ratio. Greater damage is thus inflicted on the player that is the opponent, thereby offering a greater variety of strategies.

Increasing the damage is not limited to the case of consecutive areas being specified as specific areas. Upon the attacking player placing one character on the field, specific areas may be specified along two or more axes. In this case, the calculation module 150 may increase the damage inflicted on the defending player by a predetermined ratio. The predetermined ratio may be varied in accordance with the number of axes along which specific areas are specified. When specific areas are specified along two axes, the calculation module 150 may double the damage. When specific areas are specified along three axes, the calculation module 150 may triple the damage. When specific areas are specified along four axes, the calculation module 150 may quadruple the damage. Note that the predetermined ratio for increasing the damage is not limited to the above-described multiples.

The calculation module 150 may also vary the ratio for increasing the damage in accordance with the relationship between the axes of the specific areas. When specific areas are specified along two orthogonal axes, the calculation module 150 may increase the damage by a first ratio. When specific areas are specified along two axes that are not orthogonal, the calculation module 150 may increase the damage by a second ratio. The second ratio is a different ratio than the first ratio. The second ratio may be larger than the first ratio or smaller than the first ratio.

When the specific areas have a predetermined placement, the calculation module 150 may also increase the damage by a predetermined ratio in accordance with the placement. In this case, the ratio by which the calculation module 150 increases the damage may be varied in accordance with the placement of the specific areas.

Up to this point, the case of the calculation module 150 increasing the damage has been described, yet the calculation module 150 may decrease the damage by a predetermined ratio when the specific areas satisfy a predetermined condition. In any of the above-described conditions for increasing the damage, the calculation module 150 may instead decrease the damage.

FIG. 7 schematically illustrates an example of the skill management data 170. The skill management data 170 includes a table such as the one in FIG. 7. The table of the skill management data 170 includes, for each player, information related to characters, skill information associated with each character, and a state of skill usage.

In FIG. 7, α1 to α5 and β1 to β5 are listed as skill information and indicate specific skills. The skill information includes the case of changing the hit points associated with a player. Changing the hit points associated with a player refers to increasing or decreasing the hit points associated with a predetermined player.

The skill information also includes the case of changing a parameter associated with a character when the calculation module 150 makes a calculation in each turn. Changing the parameter refers to increasing or decreasing the parameter of a predetermined character.

The skill information also includes the case of converting one of the state of parameters managed by the field management data 120. Converting the state of parameter refers to converting, in the table of the field management data 120 in FIG. 4, the state of parameter of an area with a state of parameter of "1" to "2" or vice-versa. Accordingly, by converting the state of parameter, the valid parameter of a character is converted.

The skill information also includes the case of changing the correspondence between areas and characters managed in the field management data 120. Changing the correspondence refers to associating a character that is associated with a particular area with another area in the table of the field management data 120 in FIG. 4. By changing the correspondence, an area with which a character was not associated becomes associated with a character that had been associated with a different area. In this case, in the field illustrated in FIG. 3, the character moves from the area with which the character had been associated to the newly associated area.

The skill information also includes the case of changing an area managed by the field management data 120 to a state of not being associated with any character. By changing a predetermined area in the table of the field management data 120 in FIG. 4 to a state of not being associated with any character, the predetermined area enters a state such that no character is positioned in the predetermined area in the field illustrated in FIG. 3.

The skill may be used automatically when a player places a character on the field. Alternatively, the skill may be used automatically when a predetermined condition is satisfied. The skill may also be usable by a player in any turn. Each skill may be configured to be usable only once.

In the table of the skill management data 170 in FIG. 7, information indicating a state related to usage of each skill is registered in the column for the state of skill usage. When the skill information is registered by the control processor 130 in the table of the skill management data 170, the control processor 130 registers "usable" as the state of skill usage to indicate that the skill may be used. A player can use a skill for which the state of skill usage is "usable".

Once the skill is used, the control processor 130 registers "used" as the state of skill usage. A skill with a state of skill usage of "used" has been used once and therefore is unusable.

When converting the state of parameter of a character, in the table of the field management data 120, associated with a skill for which the state of skill usage is "usable", the control processor 130 registers "unusable" as the state of skill usage in the table of the skill management data 170. When the control processor 130 converts the state of parameter, the character whose state of parameter is converted is associated with another player. Therefore, by the control processor 130 registering "unusable" as the state of skill usage, the skill associated with the character whose state of parameter was converted becomes unusable.

With regard to a skill for which "unusable" has been registered as the state of skill usage, the control processor 130 may again register "usable" as the state of skill usage if the character having this skill returns to being associated with the original player due to the parameter of the character once again being converted. The player thus becomes able to use the skill. Alternatively, with regard to a skill for which "unusable" has been registered as the state of skill usage, the control processor 130 may leave the state of skill usage as "unusable" even if the character having this skill returns to being associated with the original player due to the parameter of the character once again being converted. In this case, the skill of the character whose parameter has been converted once is subsequently unusable.

Figure 8:
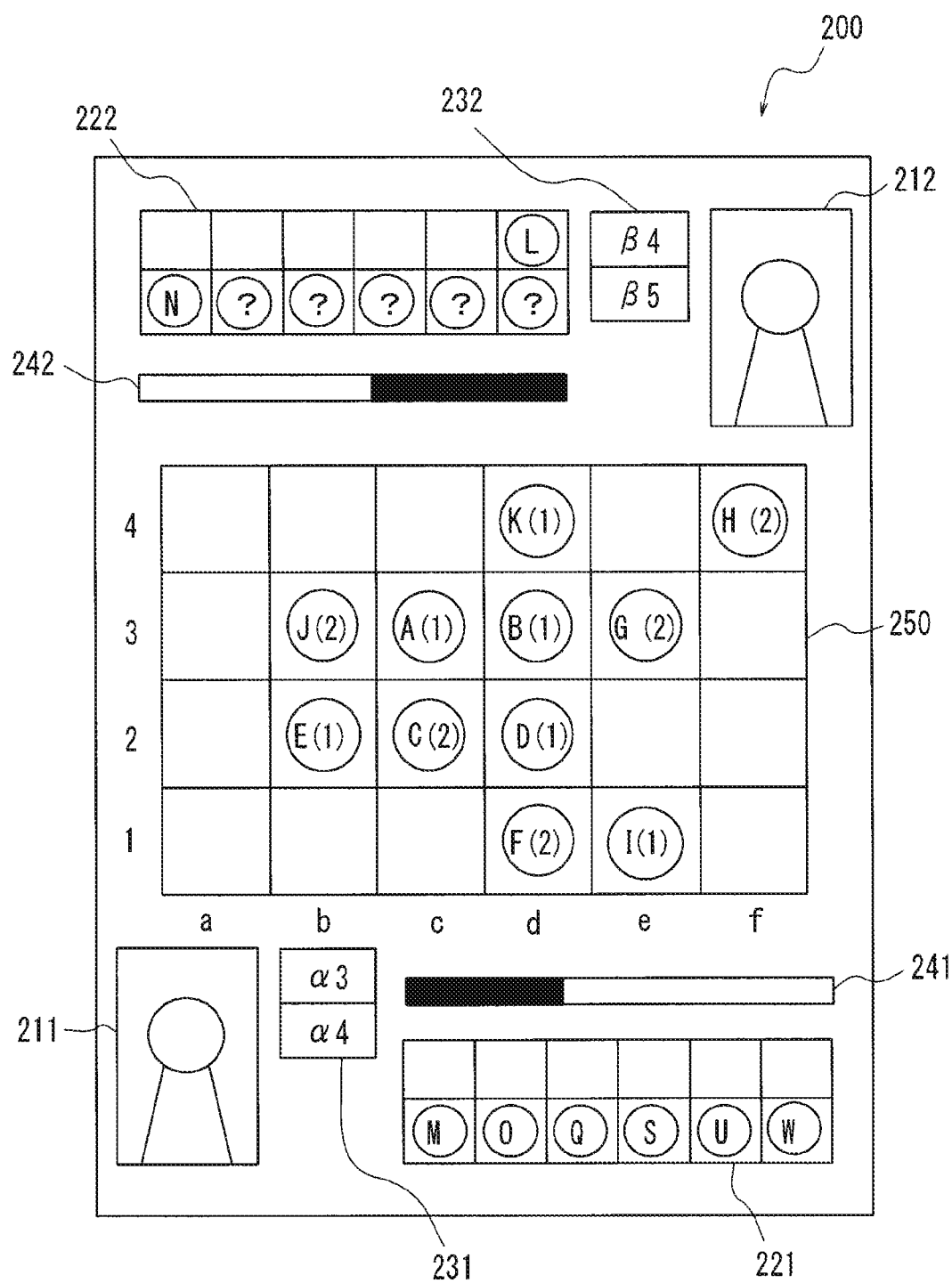
FIG. 8 illustrates an example of the game screen displayed on the display.

FIG. 8 illustrates an example of a game screen displayed on the display 180. As illustrated in FIG. 8, the game screen 200 includes player displays 211 and 212, character displays 221 and 222, skill displays 231 and 232, hit point displays 241 and 242, and a field display 250.

The player displays 211 and 212 display the players of the game. Player one (the user) is displayed in the player display 211. Player two (the player controlled by the information processing device 100) is displayed in the player display 212.

The character displays 221 and 222 display characters that each player can place on the field. Characters that player one can place on the field are displayed in the character display 221, and characters that player two can place on the field are displayed in the character display 222. The character displays 221 and 222 need not display the characters that the players have already placed on the field.

The character display 222 may display character information regarding a portion of the characters of player two that is competing in the game with player one (for example, two characters in FIG. 8), without displaying the character information of the other characters. The character information includes a character name or the first and second parameter. The character display 222 may display the character information of all of the characters. Alternatively, the character display 222 may hide the character information of all of the characters.

The skill displays 231 and 232 respectively display the skill information that player one and player two can use. The skill displays 231 and 232 display the skill information for which the "state of skill usage" in the table of the skill management data 170 in FIG. 7 is "usable". Accordingly, a skill newly becomes usable by a player placing a character on the field. When a skill is registered in the table of the skill management data 170 in a usable state, the skill displays 231 and 232 newly display the corresponding skill information. Furthermore, when the "state of skill usage" of a skill changes in the table of the skill management data 170 from a "usable" state to an "unusable" or "used" state, the skill information of that skill is removed from the skill displays 231 and 232.

The hit point displays 241 and 242 respectively display the hit points associated with player one and player two. The hit point displays 241 and 242 can display the hit points as a bar indicator, yet the display of hit points is not limited to this example. The hit point displays 241 and 242 may display the hit points as a numerical value.

The field display 250 displays the field used in the game, such as the field in FIG. 2 and FIG. 3.

Next, progress of the game executed by the information processing device 100 is described.

FIGS. 9 to 12 illustrate examples of game progress. At the start of the game, each player selects 12 characters to use. At this time, the user (player one) uses the input interface 190 to select 12 characters from among characters stored in the memory 110. The control processor 130 for example stores the selected characters in the memory 110.

In the example of game progress described below, the order of characters placed by player two is assumed to be decided in advance by the information processing device 100. Furthermore, the character information of characters that player two places on the field is displayed for the following two turns in the character display 222. Hence, player one (the user) can know the character information of the characters that player two is going to place for the following two turns. Note that the order of characters that player two is going to place on the field need not be decided in advance. Also, the character information of the characters that player two is going to place on the field may all be displayed or hidden in the character display 222.

Figure 9:
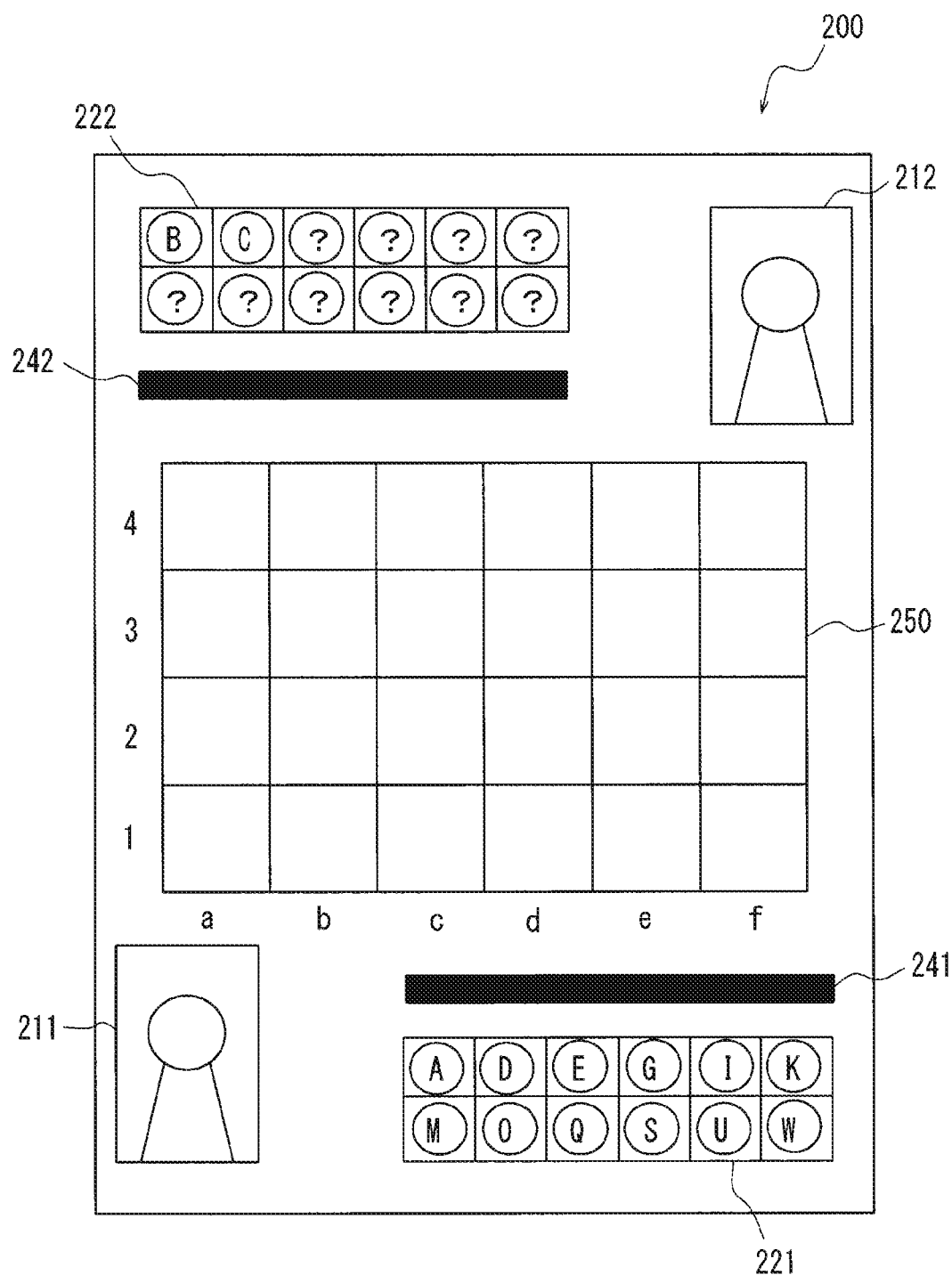
FIG. 9 illustrates an example of game progress.
Figure 10:
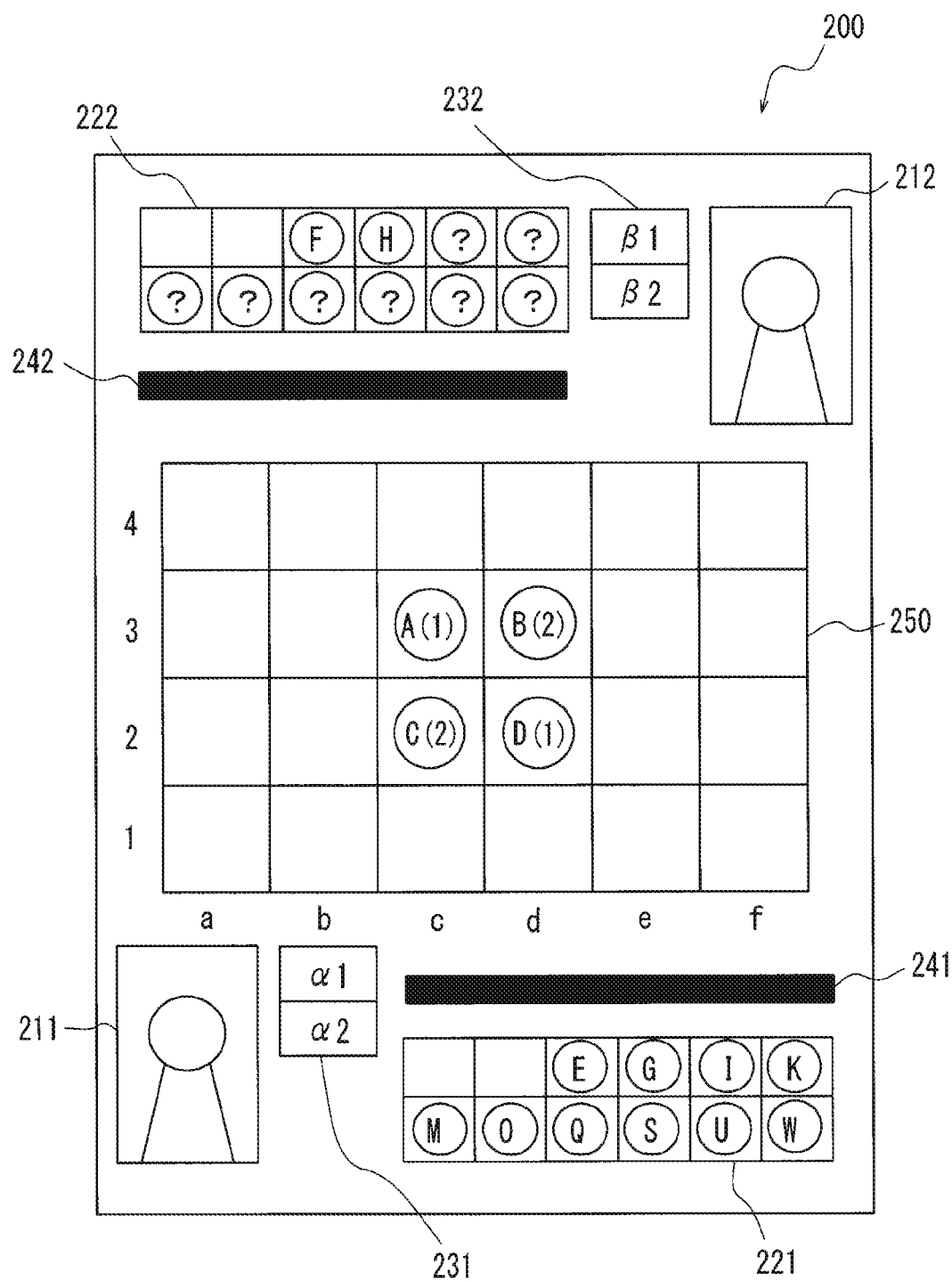
FIG. 10 illustrates an example of game progress.

At the start of the game, the characters selected by each player are displayed in the character displays 221 and 222 on the game screen 200, as illustrated in FIG. 9. First, using the input interface 190, the user selects two characters to place initially on the field. Here, it is assumed that the user selects characters A and D. The control processor 130 then stores the selected characters and the state of parameters of the selected characters in the field management data 120. As a result, characters are displayed in the center of the field on the game screen 200, as illustrated in FIG. 10. Player two's characters are selected in the order decided in advance and placed on the field. Along with placing characters on the field, the control processor 130 registers skill information in the skill management data 170. The skills usable by each player are thus displayed in the skill displays 231 and 232 of the game screen 200.

Next, as the first turn, the user that is the attacking player (player one) places a character on the field. The user uses the input interface 190 to designate a character to place and an area in which to place the character. Here, it is assumed that the user designates placement of character E in area b2.

In accordance with the user designation, the control processor 130 stores character E in the field management data 120 in the state of first parameter. At this time, the control processor 130 registers skill α3 possessed by character E as "usable" in the "state of skill usage" of the skill management data 170. The specification module 140 then specifies a specific area. Here, the specification module 140 specifies area c2 as a specific area. Next, the calculation module 150 calculates the hit points associated with player two. Here, assume the user uses the input interface 190 to designate use of skill α1. Assume that skill α1 doubles the parameter of a predetermined character for one turn. When the user designates to double the parameter of character E by the effect of skill α1, the calculation module 150 applies the effect of skill α1 to calculate the hit points, storing the result of calculation in the memory 110. In accordance with use of skill α1 by the user, the control processor 130 also changes the "state of skill usage" of the skill management data 170 from the "usable" state to the "used" state. Once the calculation module 150 has finished calculating the hit points, the control processor 130 changes the state of parameter associated with character C in the field management data 120 from "2" to "1". Regarding skill β2 associated with character C whose state of parameter was changed, the control processor 130 changes the "state of skill usage" of the skill management data 170 from the "usable" state to the "unusable" state.

Figure 11:
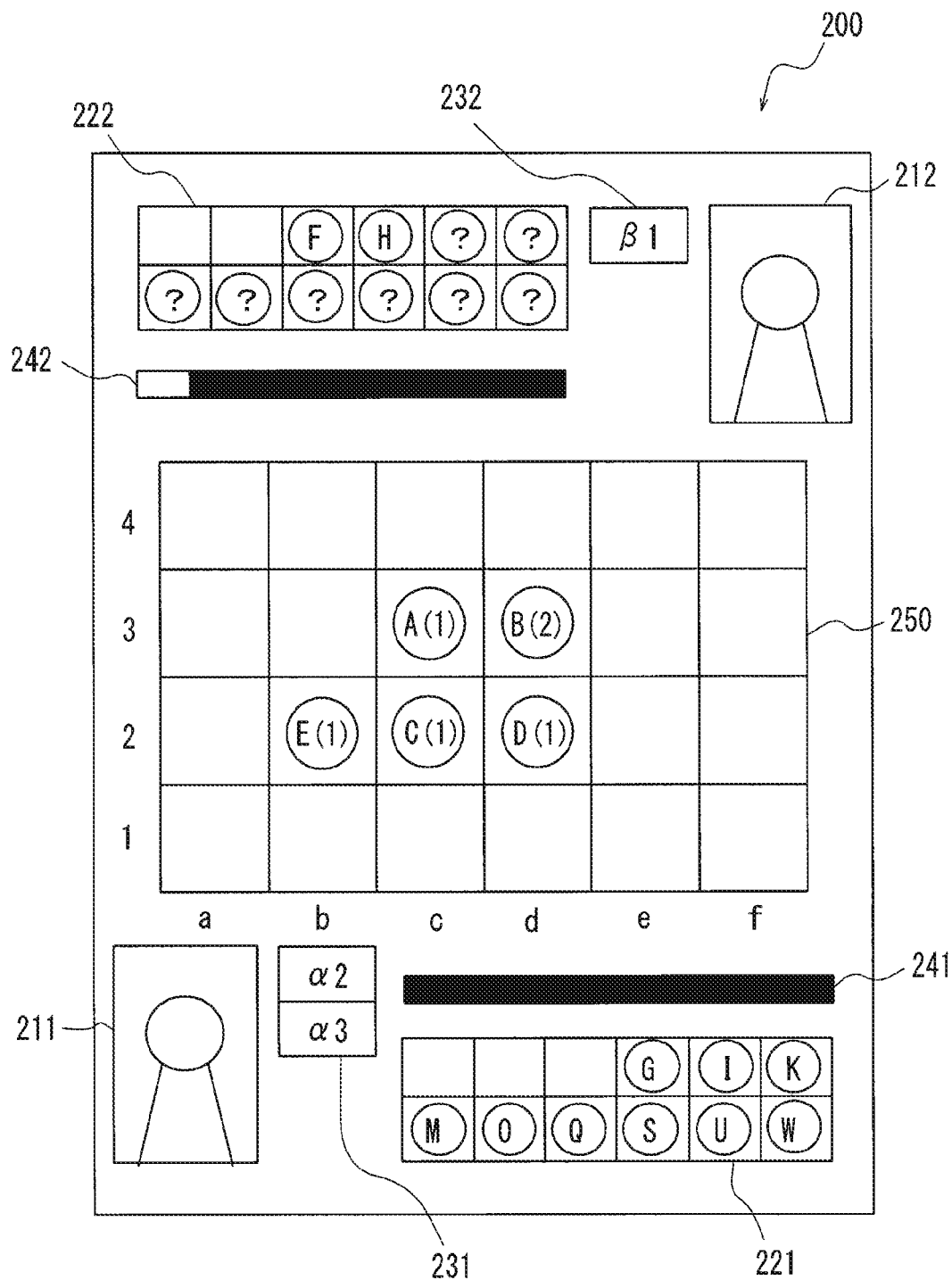
FIG. 11 illustrates an example of game progress.

FIG. 11 is a game screen for when processing related to the first turn by player one is complete. As shown in the field display 250, character E has been placed in area b2. Also, the state of parameter of character C positioned in specific area c2 has been converted to the state of first parameter. Player two is therefore no longer able to use skill β2, and display of skill β2 has been removed from the skill display 232. Since player one used skill α1, display of skill α1 has been removed from the skill display 231. Furthermore, since character E has been placed on the field, the display of skill α3 associated with character E has been added to the skill display 231. Due to calculation of hit points by the calculation module 150, the hit points associated with player two have been reduced, as shown by the hit point display 242.

The processing for player one's turn thus terminates. Next, as the attacking player, player two designates a character and an area. Player two designates placement of character F, as decided in advance, in area d1. In accordance with this designation, the control processor 130 then stores character F in the field management data 120 in the state of second parameter. At this time, the control processor 130 registers skill β3 possessed by character F as "usable" in the "state of skill usage" of the skill management data 170. Next, the specification module 140 specifies a specific area. Here, the specification module 140 specifies area d2 as a specific area. The calculation module 150 calculates the hit points associated with player one and stores the result of calculation in the memory 110. Once the calculation module 150 has finished calculating the hit points, the control processor 130 changes the state of parameter associated with character D in the field management data 120 from "1" to "2". Regarding skill α2 associated with character D whose state of parameter was changed, the control processor 130 changes the "state of skill usage" of the skill management data 170 from the "usable" state to the "unusable" state.

Figure 12:
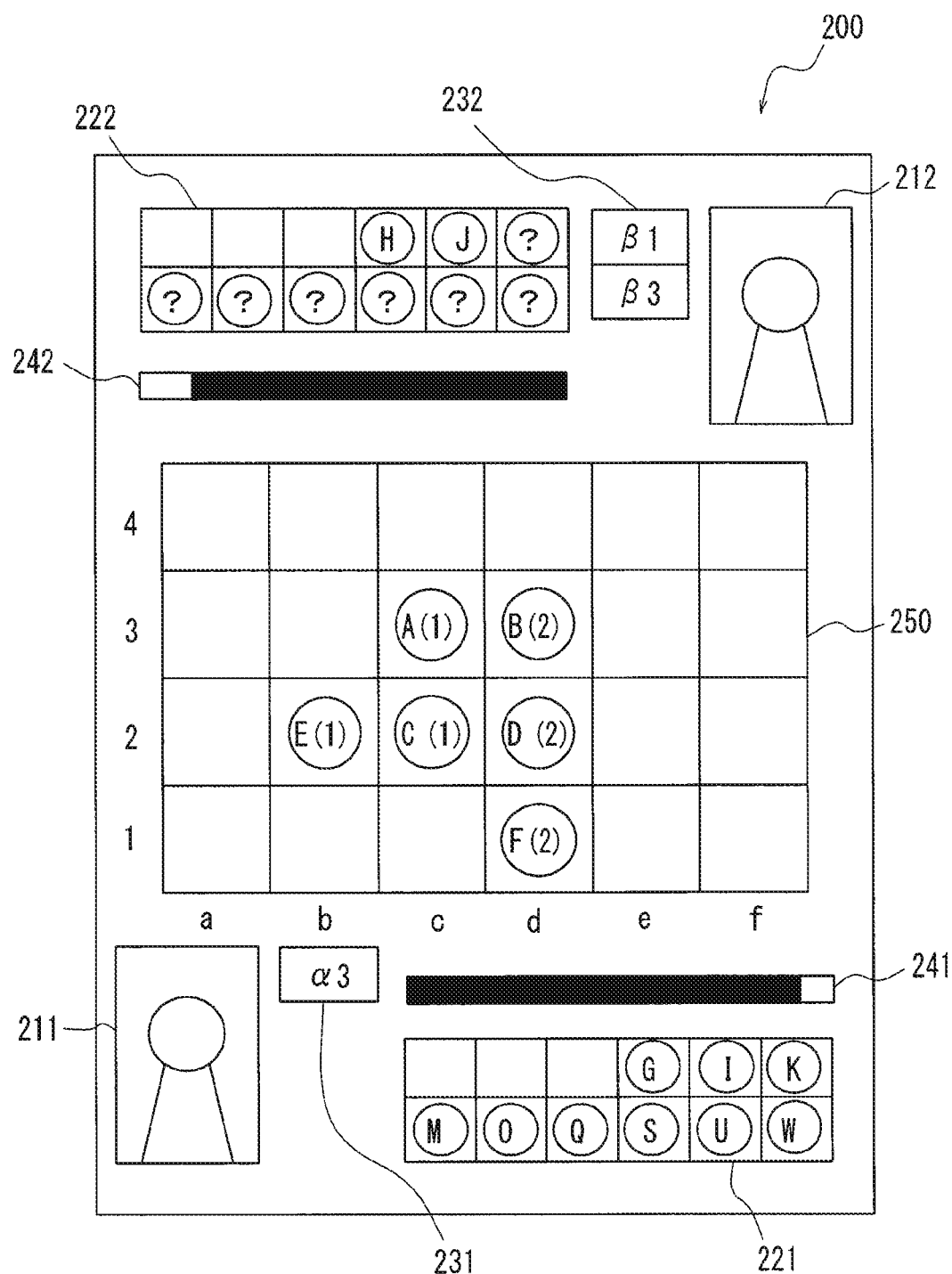
FIG. 12 illustrates an example of game progress.

FIG. 12 is a game screen for when processing related to the turn by player two is complete. As shown in the field display 250, character F is positioned in area d1, and the state of parameter of character D positioned in the specific area d2 has been converted to the state of second parameter. Player one is therefore no longer able to use skill α2, and display of skill α2 has been removed from the skill display 231. Furthermore, since character F has been placed on the field, the display of skill β3 associated with character F has been added to the skill display 232. Due to calculation of hit points by the calculation module 150, the hit points associated with player one have been reduced, as shown by the hit point display 241.

Upon termination of processing for player two's turn, player one once again designates a character and an area as the attacking player. The players repeat this process to change the hit points of their opponent. The player that first causes the opponent's hit points to fall to zero or less wins the game.

Figure 13:
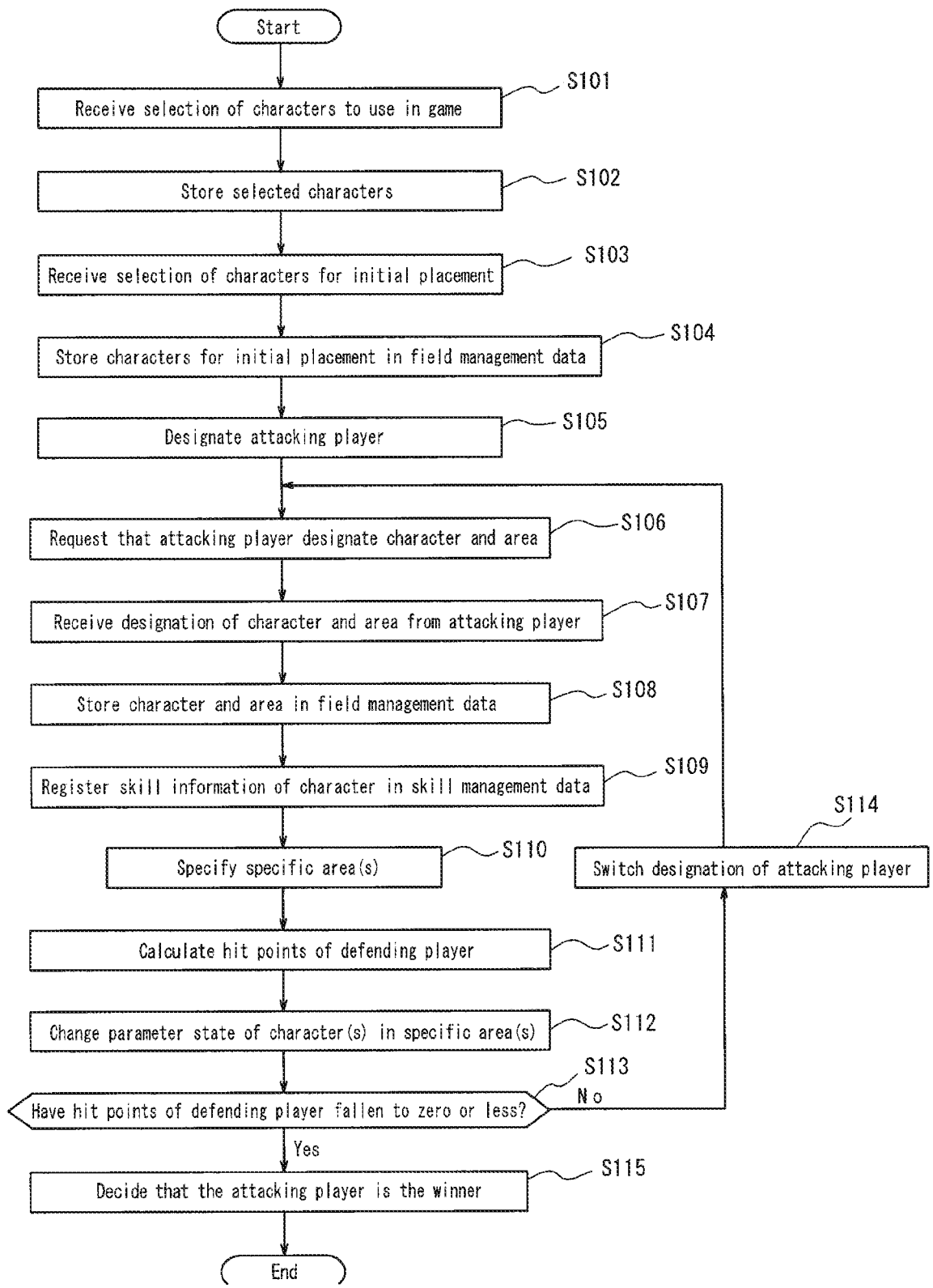
FIG. 13 is a flowchart illustrating an example of processing executed by the information processing device in FIG. 1.

Next, with reference to FIG. 13, operations by the information processing device 100 of the present embodiment are described. FIG. 13 is a flowchart illustrating an example of processing executed by the information processing device 100 in FIG. 1.

Upon starting the game, the control processor 130 first receives, from each player, characters selected by each player to use in the game (step S101). The control processor 130 then stores the received characters in the memory 110 (step S102).

The control processor 130 receives, from each player, selection of characters for initial placement on the field at the start of the game (step S103). The control processor 130 then stores the received characters for initial placement in the field management data 120 (step S104).

The control processor 130 designates the first attacking player (step S105). The control processor 130 may designate the first attacking player by any method. The control processor 130 may designate the first attacking player randomly each time the user begins the game. Alternatively, the control processor 130 may designate the first attacking player in accordance with user input.

Subsequently, the control processor 130 requests that the attacking player designate a character to place on the field and an area in which to place the character (step S106). When the user is the attacking player, the control processor 130 may request designation via a screen display that prompts for designation on the display 180.

Upon the attacking player designating a character and an area, the control processor 130 receives the designation of the character and the area (step S107). The control processor 130 then stores the received character and area in the field management data 120 (step S108). When the designated character has a skill, the control processor 130 registers the skill information for the skill in the skill management data 170 (step S109).

Based on the information stored in the field management data 120, the specification module 140 specifies specific area(s) (step S110). Based on the specific area(s) specified by the specification module 140, the calculation module 150 calculates the hit points associated with the defending player (step S111).

The control processor 130 changes the state of parameter, in the field management data 120, of the character(s) associated with the specific area(s) (step S112). At this time, when a usable skill associated with a character whose state of parameter has changed is registered in the skill management data 170, the control processor 130 changes registration of the skill to an unusable state.

The victory/defeat determination module 160 determines whether the hit points associated with the defending player have fallen to zero or less (step S113).

When the victory/defeat determination module 160 determines that the hit points associated with the defending player are greater than zero (step S113: No), the control processor 130 switches the designation of the attacking player and the defending player (step S114).

The control processor 130 requests that the attacking player designate a character to place on the field and an area in which to place the character (step S106). In this way, the information processing device 100 repeats steps S106 through S113 until the victory/defeat determination module 160 determines that the hit points associated with the defending player have fallen to zero or less.

When the victory/defeat determination module 160 determines that the hit points associated with the defending player have fallen to zero or less (step S113: Yes), the control processor 130 decides that the attacking player when the determination was made is the winner of the game (step S115).

As described above, the information processing device 100 according to the present embodiment specifies specific areas based on the characters placed by the players and the state of parameter of the characters. Based on the parameters of the placed characters and the characters in the specific areas, the information processing device 100 changes the hit points associated with the players. Victory and defeat the game are decided in accordance with whether the hit points have fallen to zero or less. In other words, the extent of damage inflicted on a player changes based on the value of the character's parameter and the area in which the character is placed. Therefore, in order to inflict greater damage on the opposing player, the user can take into consideration the character's parameter as well as the area in which to place the character. Therefore, the information processing device 100 offers a greater variety of game strategies and makes the game more interesting. In the game provided by the information processing device 100, even if the parameter of the character initially selected by the player has a high value, the damage inflicted on the opposing player changes based on the placement of the character by the player. Therefore, based on character placement, game strategies increase in variety, and the game becomes more interesting.

Furthermore, each character has a plurality of parameters, and the parameters are converted in accordance with the positional relationship of characters placed on the field. Therefore, the user plays the game by deciding on placement of a character based on consideration not only of parameters associated with the user but also the parameters associated with the other player. Therefore, the information processing device 100 offers a greater variety of game strategies and makes the game more interesting.

Hit points are calculated based on the parameter of a character placed on the field by the player and of another character, already placed on the field, that is in the same state of parameter, such that these characters sandwich a character in a different state of parameter. Hence, the user plays the game by deciding on placement of a character based on consideration of the position and parameters of a character that has already been placed on the field. The information processing device 100 therefore offers a greater variety of game strategies and makes the game more interesting.

During the game, upon using a skill that a character has, an effect in accordance with the skill is achieved. Hence, the user plays the game while taking characters' skills into consideration. The information processing device 100 therefore offers a greater variety of game strategies and makes the game more interesting.

This disclosure is based on the drawings and embodiments, yet it is to be noted that various changes and modifications will be apparent to those skilled in the art based on this disclosure. Therefore, such changes and modifications are to be understood as included within the scope of the disclosure. For example, the functions and the like included in the various means and steps may be reordered in any logically consistent way. Furthermore, means or steps may be combined into one or divided.

The information in the table of the field management data 120 is not limited to the information shown in FIG. 4. In addition to the information regarding the character and the state of parameter as shown in FIG. 4, the field management data 120 may include event information associated with each area. The event information is unique information associated with an area and achieves a predetermined effect as the game progresses.

The event information may be stored in advance in the table of the field management data 120 at the start of the game. The event information may also be stored in the table of the field management data 120 as a skill that a character has. The effect of an event related to the event information may be achieved through execution of the event by the control processor 130 from the start of the game. Alternatively, the effect of an event related to the event information may be achieved through execution of the event by the control processor 130 when a predetermined condition is satisfied during the game. When newly storing a character in association with a certain area as a result of the user designating placement of the character, the control processor 130 may execute the event of the event information associated with the area. The effect of an event related to the event information may also be cancelled through the control processor 130 terminating execution of the event when a predetermined condition is satisfied during the game.

The event information may include similar information to the skill information. The event information may include at least one of the following cases: changing the hit points associated with the player, changing the parameter associated with the character, changing one of the state of parameters managed by the field management data 120, changing the correspondence between areas and characters managed by the field management data 120, and changing an area managed by the field management data 120 to a state of not being associated with any character. The effects of the events due to event information in the examples listed above may be similar to the effects in the description of skill information in the above embodiment.

The control processor 130 may display the event information in an area of the field. The control processor 130 displays the event information explicitly or implicitly. When the event information is displayed explicitly, the content of the event is displayed in an area of the field. When the event information is displayed implicitly, information related to the content of the event is displayed in an area of the field. During an implicit display for an event relating to changing hit points, the control processor 130 displays an indication of a relationship to hit points, without displaying specifically how hit points change. During an implicit display for an event relating to increasing or decreasing a parameter, the control processor 130 displays an indication of a relationship to a parameter, without displaying the extent to which the parameter increases or decreases. During an implicit display, the control processor 130 may display the area related to the event. When a character in a predetermined area experiences the effect of an event, the control processor 130 may display the area. The control processor 130 may also display the number of areas experiencing the effect of an event.

The control processor 130 may display event information for a portion of areas, without displaying event information for other areas. The areas for which events are displayed may be decided in advance for each field. Alternatively, the areas for which events are displayed may be selected randomly each time a battle is held in the game. In an area in which the event information is displayed, the event information is displayed explicitly or implicitly, as described above.

By thus associating events with areas on the field, the user plays the game by deciding on placement of characters based on consideration of the effect of events associated with the field. Accordingly, apart from damage inflicted on the opposing player as a result of placing a character, the user can also consider the effect of events in the field where characters are placed. When the event information is displayed explicitly, it may be the case that while great damage is inflicted on the opponent by placing a character in a certain area, the user suffers a disadvantage due to the effect of the event. In this case, the user plays the game while taking such a trade-off into consideration. When the event information is displayed implicitly, the user can play the game while guessing at the content of the event information. Therefore, game strategies further increase in variety, and the game becomes more interesting.

When the event information is not displayed, an event not anticipated by the user may occur when the attacking player places a character on the field. The balance of the game may therefore change drastically, making the game more interesting.

In the above embodiment, each character has been described as having a plurality of parameters. The parameters may each include attack points (attack strength) and defense points (defense strength). When each character includes a first and second parameter, as in the above embodiment, the first parameter may include attack points (first attack points) and defense points (first defense points), and the second parameter may include attack points (second attack points) and defense points (second defense points).

When each parameter includes attack points and defense points, the calculation module 150 calculates the hit points based on, among the characters, the attack points of the state of parameter associated with the attacking player and the defense points of the state of parameter associated with the defending player. Here, with reference to FIG. 14, an example of a modification to the method of calculating hit points is described. As in the description of the above embodiment, the specification module 140 specifies, as a specific area, an area that is sandwiched by characters in the state of first parameter and in which a character in the state of second parameter is positioned.

Figure 14:
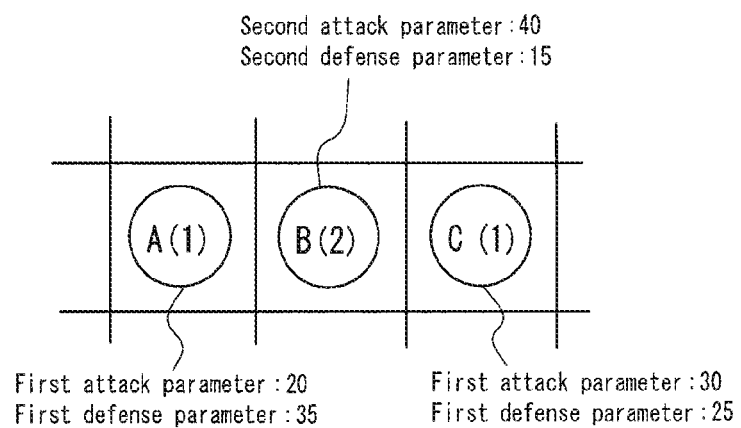
FIG. 14 illustrates an example of a modification to the calculation method used by the calculation module.

FIG. 14 illustrates an example of a modification to the calculation method used by the calculation module 150. In the state in FIG. 14, character B for whom the second parameter is valid and character C for whom the first parameter is valid have been placed in advance on the field. The following describes calculation of hit points when, in this state, player one is the attacking player and places character A on the field. Assume that the first attack points are 20 and the first defense points are 35 for character A, that the second attack points are 40 and the second defense points are 15 for character B, and that the first attack points are 30 and the first defense points are 25 for character C. Also assume that the hit points associated with the defending player are "300".

When player one places character A on the field, character A is in a state such that the first parameter is valid. At this time, the area associated with character B is sandwiched between areas respectively associated with characters A and C. Therefore, the area associated with character B is specified by the specification module 140 as a specific area. In this case, the attacking player is player one associated with the first parameter. The calculation module 150 first calculates the total of the first attack points "20" of character A and the first attack points "30" of character C, i.e. "50". Next, the calculation module 150 calculates the difference between this total "50" and the second defense points "15" of character B, i.e. "35". By subtracting the difference "35" as damage from the hit points "300" associated with the defending player, the calculation module 150 calculates the hit points associated with the defending player to be the result of subtraction, i.e. "265". As in the above embodiment, when the difference is zero or less, the calculation module 150 does not change the hit points associated with the defending player.

When each parameter includes attack points and defense points, the user can play the game by deciding on placement of characters based on consideration not only of the state of parameter of characters but also the attack points and defense points in each state of parameter. For example, the user may have a character with high attack points and low defense points. When the user places this character on the field, the user may be able to inflict great damage on the opponent due to the high attack points. On the other hand, since this character has low defense points, the user might later sustain great damage as a result of placing this character on the field. The user can play the game while taking this trade-off into consideration. Therefore, game strategies further increase in variety, and the game becomes more interesting.

In the game in this disclosure, based on user operation, the control processor 130 can cause a character to grow as a result of combination. At this time, the control processor 130 may yield different growth results for each state of parameter in accordance with the characters that are combined. When a character includes the state of first parameter and the state of second parameter as in the above embodiment, the control processor 130 may increase only the first parameter as a result of combining characters. The control processor 130 may also increase the first parameter more than the second parameter as a result of combining characters. Alternatively, the control processor 130 may decrease the first parameter as a result of combining characters. The same holds for the second parameter as well. The control processor 130 may also change the ability information of a character as a result of combining characters.

Depending on the combined characters, the growth results may thus differ when characters are combined to change the parameters and ability information of the characters. Hence, the user can consider which character to cause to grow. Game strategies therefore further increase in variety, and the game becomes more interesting.

In the game described in the above embodiment, if a character would not form a predetermined positional relationship with a character of the state of parameter associated with the defending player in any of the areas on the field in which the attacking player could place the character, then the control processor 130 may end the turn of the attacking player without receiving the designation of a character and an area from the attacking player. In this case, the same player continues to place a character on the field.

When receiving the designation of a character and an area from the attacking player, the control processor 130 may display the areas in which the attacking player can place the character on the field display 250. The method for this display may be any method recognizable by the attacking player. This display may, for example, be achieved by changing the color of the corresponding areas or covering the corresponding areas with a frame.

When the same player continuously places a character on the field, the player may subsequently run out of characters to place on the field, depending on game conditions. To avoid this situation, the control processor 130 may, at the start of the game, have each player select several spare characters.

In the above embodiment, the opponent of a single user (player one) has been described as a player automatically controlled by the information processing device 100 (player two), yet player two may be a different user than player one. When users thus compete with each other, the order of characters placed on the field is not decided for either player one or two. Therefore, both players one and two can designate a character to place on the field each turn.

When two users are competing, the character displays 221 and 222 either display all of the characters or hide all of the characters in the character display 221 for the opponent.

The players of this game are not limited to two players, i.e. player one and player two. Rather, this game may be played with three or more players. When playing with three or more players, each character has state of parameters corresponding to the number of competing players. Hence, when playing with three or more players, each character has a first, second, and third state of parameter. When playing with four or more players, each character has a first, second, third, and fourth state of parameter. The state of parameters are associated one-to-one with the players.

When thus playing the game with three or more players, each player plays the game with a plurality of players as opponents, thus expanding strategic options regarding which character to place in which area during one's own turn. If one player takes the lead during the game, it is envisioned that the other players may cooperate to attack the player in the lead. Game strategies therefore further increase in variety, and the game becomes more interesting.

Each character may be associated with one type of attribute information that has been classified into various types. The attribute information is information regarding any attribute, and there may be any number of types thereof. The calculation module 150 may calculate the hit points in accordance with the attribute information. At this time, the calculation module 150 may calculate the hit points using a numerical value yielded by multiplying the value of the character's parameter by a predetermined number in accordance with the attribute information.

Figure 15:
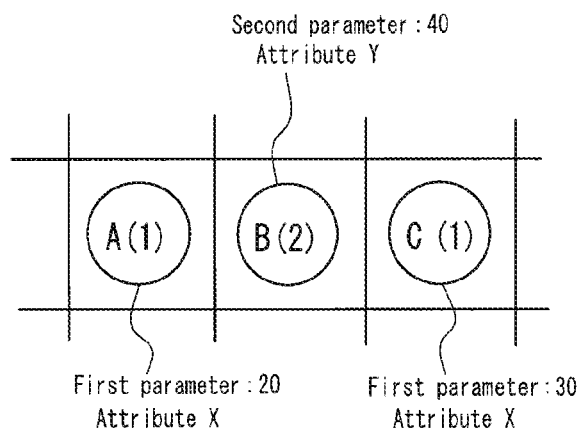
FIG. 15 illustrates an example of a modification to the calculation method used by the calculation module.

Here, with reference to FIG. 15, an example of another modification to the method of calculating hit points is described. As in the description of the above embodiment, the specification module 140 specifies, as a specific area, an area that is sandwiched by characters in the state of first parameter and in which a character in the state of second parameter is positioned.

FIG. 15 illustrates an example of a modification to the calculation method used by the calculation module 150. In the state in FIG. 15, character B for whom the second parameter is valid and character C for whom the first parameter is valid have been placed in advance on the field. The following describes calculation of hit points when, in this state, player one is the attacking player and places character A on the field. Assume that the first parameter of character A is 20, the second parameter of character B is 40, and the first parameter of character C is 30. Also assume that the hit points associated with the defending player are "300".

Assume that there are three types of attribute information in a relationship constituting a three-way standoff: attribute X, attribute Y, and attribute Z. Attribute X is superior to attribute Y, attribute Y is superior to attribute Z, and attribute Z is superior to attribute X. During calculation of hit points, the calculation module 150 doubles the parameter of a character having a superior attribute. Assume that character A has attribute X, character B has attribute Y, and character C has attribute X.

When player one places character A on the field, character A is in a state such that the first parameter is valid. At this time, the area associated with character B is sandwiched between areas respectively associated with characters A and C. Therefore, the area associated with character B is specified by the specification module 140 as a specific area. In this case, characters A and C have attribute X, which is superior to attribute Y of character B. The calculation module 150 doubles the respective parameters "20" and "30" of characters A and C and uses the resulting values "40" and "60" to calculate the hit points associated with the defending player. The calculation module 150 calculates the total of the doubled parameter "40" related to character A and the doubled parameter "60" related to character C, i.e. "100". Next, the calculation module 150 calculates the difference between this total "100" and the second parameter "40" of character B, i.e. "60". The calculation module 150 then subtracts the difference "60" as damage from the hit points "300" associated with the defending player. The calculation module 150 thus calculates the hit points associated with the defending player to be the result of subtraction, i.e. "240". As in the above embodiment, when the difference is zero or less, the calculation module 150 does not change the hit points associated with the defending player.

Instead of increasing the value of the parameter of the superior character, the calculation module 150 may instead decrease the value of the parameter of the inferior character and then calculate the hit points. Alternatively, instead of changing the value of a parameter, the calculation module 150 may perform a calculation to inflict predetermined additional damage on the defending player in accordance with the attribute information.

When one of several types of attribute information is thus associated with each character, the user can play the game by deciding on placement of characters based on consideration of the attribute information of the characters. In this case, the user confirms the attributes of characters, located on the field, that are associated with the opposing player. The user then attempts to place a character having an attribute superior to the attribute of the opposing character. Subsequently, however, it is envisioned that the opponent may place on the field a character with an attribute superior to the attribute of the character placed by the user. Game strategies therefore further increase in variety, and the game becomes more interesting.

The specific area is not limited to the area in the above embodiment. The specific area may be an area that is positioned along one of four axes in the vertical, horizontal, upper-right, and lower-right directions with respect to the area in which a character is placed and that is associated with a state of parameter other than the state of parameter of the character placed by the attacking player (different state of parameter). The specific area may also be an area that is positioned adjacent in the vertical, horizontal, upper-right, or lower-right directions with respect to the area in which a character is placed and that is associated with a different state of parameter. The specific area may also be an area that is positioned adjacent in the vertical or horizontal directions with respect to the area in which a character is placed and that is associated with a different state of parameter, such that all or a portion of areas that are adjacent in the vertical or horizontal directions to the area associated with the different state of parameter are areas associated with the state of parameter of the attacking player (same state of parameter). The specific area may also be an area that is in a predetermined positional relationship with respect to the area in which a character is placed and that is associated with a different state of parameter, such that an area in the predetermined positional relationship with respect to the area associated with the different state of parameter is an area associated with the same state of parameter. These specific areas are only examples of some of the possible specific areas, and the specific areas are not limited to these examples.

Figure 16:
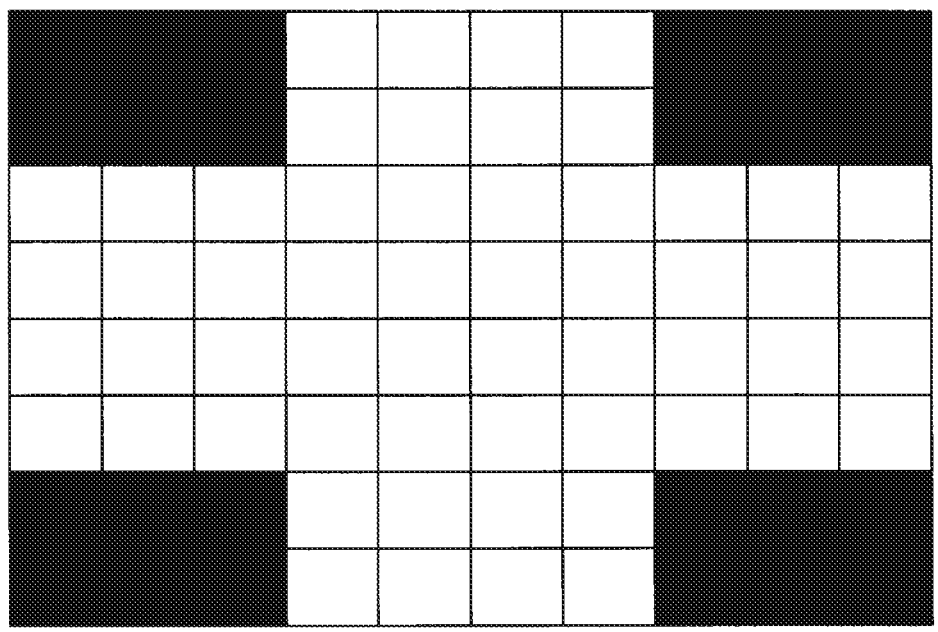
FIG. 16 illustrates an example of a modification to the field.

The number of areas in the field is not limited to 24 as in the above embodiment. The field may have any number of areas. Also, the shape of the field is not limited to the rectangle shown in the above embodiment. The field may be any shape, such as any other rectangle, a circle, or a polygon. As in FIG. 16, areas in which a character cannot be placed may be included in a portion of the field.

Figure 17:
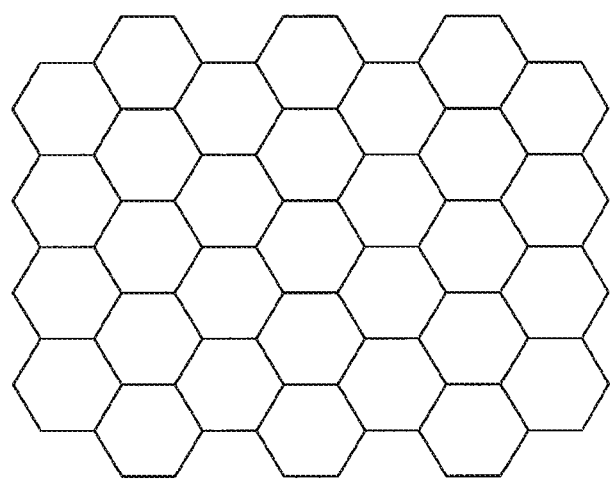
FIG. 17 illustrates an example of a modification to the field.

The areas in the field may also have any shape. FIG. 17 illustrates a field in which each area is a hexagon. The game described in this disclosure may also be played on this type of field.

By thus using fields with a variety of shapes in the game, the players can deliberate about the positional relationship of the characters they place. In particular, when the state of parameter of a character with a different state of parameter is converted due to being sandwiched by characters in the same state of parameter, the state of parameter is not subsequently converted if the character is positioned in an area at the edge of the field. In other words, by placing a character in an area at the edge, the user can gain an advantage in the game. Accordingly, it is assumed that the user will proceed in the game so as to be able to place a character in an area at the edge. Game strategies therefore further increase in variety, and the game becomes more interesting.

The control processor 130 need not display the squares that define areas on the field. Furthermore, the control processor 130 may display squares as necessary for game progress, without displaying squares otherwise. The control processor 130 may perform control so as to display squares when the player is selecting an area in which to place a character and not to display squares otherwise. As a result, the user can distinguish the image of the field more clearly.

When the attacking player is selecting an area in which to place a character, the control processor 130 may display assistance for the selection. The attacking player may examine areas in which to place a character by moving a cursor displayed on the field. In this case, the control processor 130 may display on the field the specific area(s) corresponding to the area in which the cursor is placed. The control processor 130 may also display the number of specific areas corresponding to each area of the field. The number of specific areas is the number of areas that are specified as specific areas when the attacking player places a character in a certain area. The control processor 130 can display information related to the number of specific areas by indicating a number in each area. The control processor 130 can also display information related to the number of specific areas with a color corresponding to the number of specific areas. In this case, the field is color-coded in accordance with the number of specific areas. The user can decide on placement of a character by referring to such displays of assistance.

In the game described in this disclosure, the control processor 130 may allow placement of two or more characters in one area. When two or more characters are placed in the same area, the calculation module 150 may calculate the hit points associated with a player based on the parameter of the character that was placed last. The calculation module 150 may also calculate the hit points associated with a player based on the total of the parameters of the two or more characters. The calculation module 150 may also calculate the hit points associated with a player based on the parameter of a character designated by the user.

Allowing such placement of two or more characters in the same area expands the user's options for character placement. Hence, the game becomes more complicated. Game strategies therefore further increase in variety, and the game becomes more interesting.

In the above embodiment, the information processing device 100 that executes the game has been described. This disclosure is not, however, limited in this way, and we also provide a server device that executes a game, as well as an information processing system that includes a server device and a terminal device.

Figure 18:
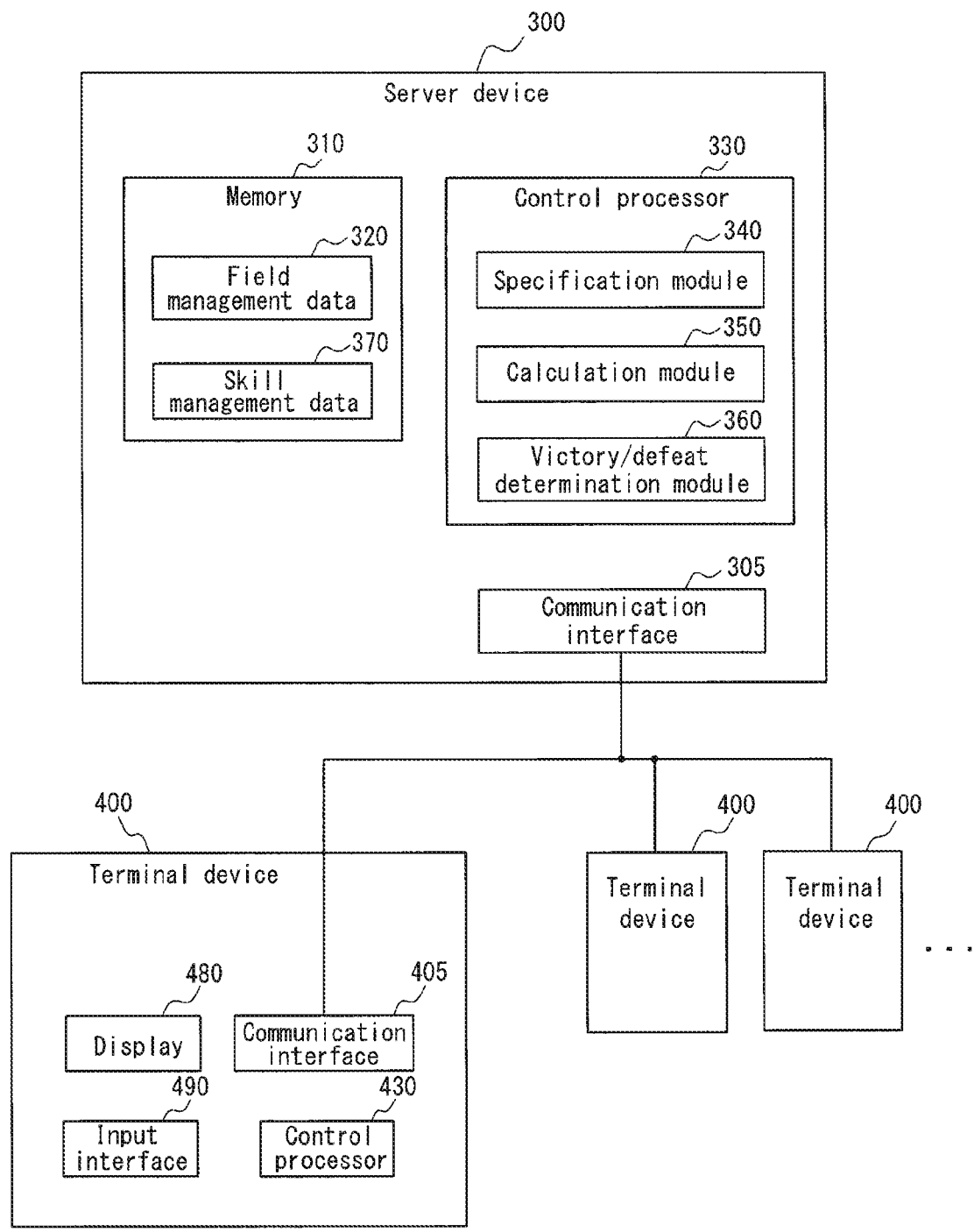
FIG. 18 is a functional block diagram of a section of an information processing system.

FIG. 18 is a functional block diagram of a section of our information processing system. As illustrated in FIG. 18, the information processing system includes a server device 300 and a terminal device 400.

The server device 300 includes a memory 310, field management data 320, control processor 330, specification module 340, calculation module 350, victory/defeat determination module 360, skill management data 370, and communication interface 305. The functions of the memory 310, field management data 320, specification module 340, calculation module 350, victory/defeat determination module 360, and skill management data 370 are respectively similar to those of the memory 110, field management data 120, specification module 140, calculation module 150, victory/defeat determination module 160, and skill management data 170 in the information processing device 100. Hence, a description thereof is omitted. The control processor 330 is a processor that controls and manages the entire server device 300, starting with the functional blocks of the server device 300. The communication interface 305 transmits and receives data used in the game by performing wired or wireless communication with the terminal device 400 used by the user of the game. The communication interface 305 receives the designation of a character and an area that have been input into the terminal device 400. To cause a display 480 of the terminal device 400 to display a game screen, the communication interface 305 transmits information stored in the field management data 320 to the terminal device 400.

The terminal device 400 is provided with a display 480, input interface 490, communication interface 405, and control processor 430. The terminal device 400 may be a dedicated device for executing a game. The terminal device 400 may also be configured using an electronic device such as a mobile phone, a tablet terminal, or the like. The functions of the display 480 and the input interface 490 are respectively similar to those of the display 180 and the input interface 190 in the information processing device 100. Hence, a description thereof is omitted. The control processor 430 is a processor that controls and manages the entire terminal device 400, starting with the functional blocks of the terminal device 400. The communication interface 405 transmits and receives data used in the game by performing wired or wireless communication with the server device 300 that executes the game. The communication interface 405 transmits data related to user input from the input interface 490 to the server device 300. The input interface 405 receives information related to game screens transmitted from the server device 300.

By communicating with a plurality of terminal devices 400, the server device 300 provides the game to a plurality of users via the terminal devices 400.

An information processing device such as a computer, a mobile phone, or the like may be caused to function as the information processing device 100 of the above embodiment. In such an information processing device, a program containing a description of the processing for achieving the functions of the information processing device 100 according to the embodiment is stored in memory of the information processing device, and the functions are achieved by the CPU of the information processing device reading and executing the program.

When our information processing system is configured as the terminal device 400 and the server device 300 connected over a network, screens showing game progress may be a Web view displayed on the terminal device 400 based on data generated by the server device 300, and other screens, such as menu screens, may be native views displayed by a native application installed on the terminal device 400. The information processing system may thus execute a hybrid game in which the server device 300 and the terminal device 400 each bear a portion of the processing load.

The invention claimed is:

1. A control method of a game executed by an information processing device, the method comprising the step of:

storing a plurality of first game media associated with a first player and a plurality of second game media associated with a second player, each of the plurality of first game media and each of the plurality of second game media having a plurality of parameters, the plurality of parameters including a first parameter and a second parameter different from the first parameter, each of the plurality of first game media being associated with a piece of ability information;

placing one or more first selection game media, selected from the plurality of first game media based on selection made by the first player, in a first area within a field in a first parameter state in which the first parameter is valid, such that one or more pieces of the ability information associated with the one or more first selection game media are made usable in the game;

in response to the first player selecting at least one of the one or more pieces of the ability information made usable, causing an event to occur, the event producing an effect corresponding to the selected at least one of the one or more pieces of the ability information;

placing one or more second selection game media, selected from the plurality of second game media based on selection made by the second player, in a second area within the field in a second parameter state in which the second parameter is valid;

in response to the one or more second selection game media being placed in the field, converting at least a part of the one or more first selection game media placed in the field from the first parameter state to the second parameter state; and in response to the one or more second selection game media being placed in the field, changing a use status of the one or more pieces of the ability information associated with the one or more first selection game media converted from the first parameter state to the second parameter state.

2. The control method of claim 1, wherein in response to the one or more second selection game media being placed in the field, the use status of the one or more pieces of the ability information associated with the one or more first selection game media converted from the first parameter state to the second parameter state is changed from Usable to Unusable.

3. The control method of claim 1, further comprising:
converting, to the first parameter state, the one or more first selection game media converted from the first parameter state to the second parameter state; and
changing the use status of the one or more pieces of the ability information associated with the one or more first selection game media converted from the second parameter state to the first parameter state.

4. The control method of claim 3, wherein the use status of the one or more pieces of the ability information associated with the one or more first selection game media converted from the second parameter state to the first parameter state is changed from Unusable to Usable.

5. The control method of claim 1, further comprising the step of varying at least one of a first point associated with the first player or a second point associated with the second player by using the one or more pieces of the ability information.

6. The control method of claim 1, further comprising the step of varying at least one of the plurality of parameters by using the one or more pieces of the ability information.

7. The control method of claim 1, wherein parameter states of the one or more first selection game media and the one or more second selection game media are converted between the first parameter state and the second parameter state by using the one or more pieces of the ability information.

8. The control method of claim 1, wherein the one or more first selection game media placed in the first area are moved to an area in the field other than the first area by using the one or more pieces of the ability information.

9. The control method of claim 1, wherein the one or more second selection game media placed in the second area are moved to an area in the field other than the second area by using the one or more pieces of the ability information.

10. The control method of claim 1, wherein a part of areas in the field is set as an area in which neither the one or more first selection game media nor the one or more second selection game media are placed, by using the one or more pieces of the ability information.

11. The control method of claim 1, wherein the one or more pieces of the ability information made usable are displayed in an area outside the field on a game screen.

12. The control method of claim 1, wherein the use status of the one or more pieces of the ability information selected by the first player is changed.

13. The control method of claim 12, wherein the use status of the one or more pieces of the ability information selected by the first player is changed from Usable to Unusable.

14. An information processing device for executing a game, comprising:
a storage unit for storing a plurality of first game media associated with a first player and a plurality of second game media associated with a second player, each of the plurality of first game media and each of the plurality of second game media having a plurality of parameters, the plurality of parameters including a first parameter and a second parameter different from the first parameter, each of the plurality of first game media being associated with a piece of ability information;
a control unit configured to:
place one or more first selection game media, selected from the plurality of first game media based on selection made by the first player, in a first area within a field in a first parameter state in which the first parameter is valid, such that one or more pieces of the ability information associated with the one or more first selection game media are made usable in the game;
in response to the first player selecting at least one of the one or more pieces of the ability information made usable, causing an event to occur, the event producing an effect corresponding to the selected at least one of the one or more pieces of the ability information selected; and
place one or more second selection game media, selected from the plurality of second game media based on selection made by the second player, in a second area within the field in a second parameter state in which the second parameter is valid; and
a conversion unit configured to, in response to the one or more second selection game media being placed in the field, convert at least a part of the one or more first selection game media placed in the field from the first parameter state to the second parameter state,
wherein in response to the one or more second selection game media being placed in the field, the control unit changes a use status of the one or more pieces of the ability information associated with the one or more first selection game media converted from the first parameter state to the second parameter state.

15. A non-transitory computer-readable storage medium storing a program for causing an information processing device for executing a game to perform the step of:
- storing a plurality of first game media associated with a first player and a plurality of second game media associated with a second player, each of the plurality of first game media and each of the plurality of second game media having a plurality of parameters, the plurality of parameters including a first parameter and a second parameter different from the first parameter, each of the plurality of first game media being associated with a piece of ability information;
- placing one or more first selection game media, selected from the plurality of first game media based on selection made by the first player, in a first area within a field in a first parameter state in which the first parameter is valid, such that one or more pieces of the ability information associated with the one or more first selection game media are made usable in the game;
- in response to the first player selecting at least one of the one or more pieces of the ability information made usable, causing an event to occur, the event producing an effect corresponding to the selected at least one of the one or more pieces of the ability information selected;
- placing one or more second selection game media, selected from the plurality of second game media based on selection made by the second player, in a second area within the field in a second parameter state in which the second parameter is valid;
- in response to the one or more second selection game media being placed in the field, converting at least a part of the one or more first selection game media placed in the field from the first parameter state to the second parameter state; and
- in response to the one or more second selection game media being placed in the field, changing a use status of the one or more pieces of the ability information associated with the one or more first selection game media converted from the first parameter state to the second parameter state.

* * * * *